US010880557B2

(12) United States Patent
Dai et al.

(10) Patent No.: US 10,880,557 B2
(45) Date of Patent: Dec. 29, 2020

(54) HIGH DYNAMIC RANGE IMAGE/VIDEO CODING

(71) Applicant: FastVDO LLC, Melbourne, FL (US)

(72) Inventors: Wei Dai, Clarksville, MD (US); Madhu P. Krishnan, Melbourne, FL (US); Pankaj N. Topiwala, Cocoa Beach, FL (US)

(73) Assignee: FASTVDO LLC, Melbourne, FL (US)

( * ) Notice: Subject to any disclaimer, the term of this patent is extended or adjusted under 35 U.S.C. 154(b) by 69 days.

(21) Appl. No.: 15/173,551

(22) Filed: Jun. 3, 2016

(65) Prior Publication Data

US 2016/0360212 A1 Dec. 8, 2016

Related U.S. Application Data

(60) Provisional application No. 62/171,385, filed on Jun. 5, 2015.

(51) Int. Cl.
*H04N 19/186* (2014.01)
*H04N 19/36* (2014.01)

(52) U.S. Cl.
CPC ........... *H04N 19/186* (2014.11); *H04N 19/36* (2014.11)

(58) Field of Classification Search
CPC .............................. H04N 19/186; H04N 19/36
See application file for complete search history.

(56) References Cited

U.S. PATENT DOCUMENTS

| RE40,081 E | 2/2008 | Tran et al. |
| 8,155,462 B2 | 4/2012 | Tran et al. |
| 8,428,135 B2 | 4/2013 | Tourapis et al. |
| 8,520,736 B2 | 8/2013 | Topiwala |
| 8,548,265 B2 | 10/2013 | Tran et al. |
| 8,913,660 B2 | 12/2014 | Tourapis et al. |
| 9,609,336 B2 | 3/2017 | Topiwala et al. |
| 2011/0115980 A1* | 5/2011 | Shmueli .................. H04N 5/57 348/607 |

(Continued)

OTHER PUBLICATIONS

Kim et al., "A New Color Transform for RGB Coding," 2004.*

(Continued)

*Primary Examiner* — Michael J Hess

(74) *Attorney, Agent, or Firm* — Fenwick & West LLP

(57) ABSTRACT

A disclosed configuration includes a system (or a computer implemented method or a non-transitory computer readable medium) for automatically preprocessing higher dynamic range image data into lower dynamic range image data through a data adaptive tuning process. By automatically preprocessing the higher dynamic range image data into the lower dynamic range image data through the data adaptive tuning process, an existing encoding process for encoding the standard dynamic range image data can be applied to the lower dynamic range image data while preserving metadata sufficient to recover image fidelity even in the high dynamic range. In one aspect, the system (or a computer implemented method or a non-transitory computer readable medium) provides for backwards compatibility between high dynamic range video services and existing standard dynamic range services. In one aspect, regrading is applied in a domain that is perceptually more uniform than the domain it is initially presented.

22 Claims, 17 Drawing Sheets

(56) References Cited

U.S. PATENT DOCUMENTS

| | | | |
|---|---|---|---|
| 2014/0254928 A1* | 9/2014 | Tsai | H04N 19/117 382/166 |
| 2014/0307785 A1 | 10/2014 | Topiwala et al. | |
| 2014/0369618 A1* | 12/2014 | Asaka | H04N 19/115 382/243 |
| 2015/0221280 A1 | 8/2015 | Van Der Vleuten | |
| 2015/0358646 A1* | 12/2015 | Mertens | H04N 1/6058 382/166 |
| 2016/0360212 A1 | 12/2016 | Dai et al. | |
| 2016/0366449 A1* | 12/2016 | Stessen | H04N 9/77 |
| 2017/0078706 A1* | 3/2017 | Van Der Vleuten | H04N 5/20 |
| 2018/0098094 A1 | 4/2018 | Wen et al. | |
| 2018/0152721 A1 | 5/2018 | Rusanovskyy et al. | |
| 2018/0242006 A1 | 8/2018 | Kerofsky et al. | |
| 2019/0052908 A1 | 2/2019 | Mertens et al. | |

OTHER PUBLICATIONS

Bjøntegaard, G., "Calculation of average PSNR differences between RD-curves," Video Coding Experts Group, Austin, Texas, USA, Apr. 2-4, 2001, four pages.

Dai, W. et al., "AHG7: 4:4:4 Lite: A High-Level Syntax Approach to a Consumer 4:4:4 Codec," JCT-VC of ITU-T SG16 WP3 and ISO/IEC JTC1/SC29/WG11, Geneva, CH, Jan. 14-23, 2013, nine pages.

François, E. et al., "Common Test Conditions for HDR/WCG Video Coding Experiments," JCT-VC of ITU-T SG 16 WP 3 and ISO/IEC JTC 1/SC 29/WG 11, San Diego, USA, Feb. 19-26, 2016, 22 pages.

Goris, R. et al., "Philips Response to CfE for HDR and WCG," ISO/IEC JTC1/SC29/WG11 MPEG2015/M36266, Warsaw, PL, Jul. 2015, 16 pages.

International Telecommunication Union, "Image Parameter Values for High Dynamic Range Television for Use in Production and International Programme Exchange," Jul. 2016, 17 pages.

International Telecommunication Union, "Parameter Values for Ultra-High Definition Television Systems for Production and International Programme Exchange," Oct. 2015, eight pages.

Le Léannec, F. et al., "Modulation Channel Information SEI Message," JCT-VC of ITU-T SG 16 WP 3 and ISO/IEC JTC 1/SC 29/WG 11, Sapporo, JP, Jun. 30-Jul. 9, 2014, 13 pages.

Le Léannec, F. et al., "Usage of Modulation Channel for High Bit-Depth and Floating Point Signal Encoding," JCT-VC of ITU-T SG 16 WP 3 and ISO/IEC JTC 1/SC 29/WG 11, Sapporo, JP, Jun. 30-Jul. 9, 2014, 12 pages.

Luthra, A. et al., "AHG on HDR and WCG," ISO/IEC JTC1/SC29/WG11 MPEG2014/M33622, Sapporo, JP, Jul. 2014, 37 pages.

Luthra, A. et al., "Call for Evidence (CfE) for HDR and WCG Video Coding," ISO/IEC JTC1/SC29/WG11 MPEG2014/N15083, Geneva, CH, Feb. 2015, 46 pages.

Miller, S. "A Perceptual EOTF for Extended Dynamic Range Imagery," SMPTE Monthly Webcast, 2014, 17 pages.

Minoo, K. et al., "Description of the Reshaper Parameters Dervication Process in ETM Reference Software," JCT-VC of ITU-T SG 16 WP 3 and ISO/IEC JTC 1/SC 29/WG 11, San Diego, USA, Feb. 19-26, 2016, 17 pages.

Topiwala, P. et al., "HDR CE5: report of Experiment 5.3.2," JCT-VC of ITU-T SG 16 WP 3 and ISO/IEC JTC 1/SC 29/WG 11, San Diego, USA, Feb. 19-26, 2016, eight pages.

Topiwala, P. et al., "New Invertible Integer Color Transforms Based on Lifting Steps and Coding of 4:4:4 Video," JVT of ISO/IEC MPEG & ITU-T VCEG, San Diego, USA, Sep. 2-5, 2003, 16 pages.

Tran, T. et al., "Advanced Dyadic Spatial Re-sampling Filters for SVC," JVT of ISO/IEC MPEG & ITU-T VCEG, Marrakech, MA, Jan. 13-19, 2007, seven pages.

Tran, T. et al., "Advanced Extended Spatial Re-sampling Filters for SVC," JVT of ISO/IEC MPEG & ITU-T VCEG, Marrakech, MA, Jan. 13-19, 2007, eight pages.

Tran, T. et al., "High-Performance Low-Complexity Re-sampling Filters for SVC," JVT of ISO/IEC MPEG & ITU-T VCEG, Klagenfurt, AT, Jul. 15-21, 2006, five pages.

Van Der Vleuten, R. et al., Proposed Electro-Optical Transfer Function (EOTF) for High Dyanmic Range (HDR) Video Delivery, ISO/IEC JTC1/SC29/WG11 MPEG2014/M34274, Sapporo, JP, Jul. 2014, three pages.

Dai, W. et al., "Regularity-constrained pre- and post-filtering for block OCT-based systems," IEEE Transactions on Signal Processing, Oct. 2003, vol. 51, No. 10, pp. 2568-2581.

Dai, W. et al., "Advanced Resampling Filters for Spatial Scalability and Chroma Sampling Applications in HEVC," Joint Collaborative Team on Video Coding (JCT-VC) of ITU-T SG16 WP3 and ISO/IEC JTC1/SC29/WG11, JCTVC-F618R3, Jul. 14-22, 2011, pp. 1-8.

Davies, T. et al., "AHG-18: Adaptive Resolution Coding (ARC)," Joint Collaborative Team on Video Coding (JCT-VC) of ITU-T SG16 WP3 and ISO/IEC JTC1/SC29/WG11, JCTVC-G264, Nov. 21-30, 2011, 12 pages.

ITU-R BT.2020, "Parameter Values for ultra-high definition television systems for production and internal programme exchange," International Telecommunications Union, Aug. 2012, 7 pages.

Mukherjee, D. et al., "The latest open-source video codec VP9—An overview and preliminary results," IEEE Picture Coding Symposium, 2013, pp. 390-393.

Segall, C.A. et al., "Pre- and post-processing algorithms for compressed video enhancement," Proc. of the Asilomar Conference on Signals and Systems, Oct. 2000, pp. 1369-1373.

Society of Motion Picture and Television Engineers, "High Dynamic Range Electro-Optical Transfer Function of Mastering Reference Displays," ST 2084, 2014, 14 pages.

Topiwala, P. et al., "FVPIO: Enhancements of VPX for SOR/HOR Applications," SPIE International Conference, Aug. 2016, 13 pages.

Tran, T.D. et al., "Lapped transform via time-domain pre- and post-filtering," IEEE Transaction on Signal Processing, Jun. 2003, vol. 51, No. 6, pp. 1557-1571.

Tran, T.D. et al., "Lapped transform via time-domain pre- and post-processing," Conference on Information Science and Systems, Mar. 21, 2001, pp. 890-895.

Vetterli, M. et al., "Wavelets and Subband Coding," Prentice Hall, Englewood Cliffs, NJ, 1995, (Title Page, Cover Page and TOC), 9 pages.

* cited by examiner

HIGH DYNAMIC RANGE IMAGE/VIDEO CODING

CROSS-REFERENCE TO RELATED APPLICATION

This application claims priority under 35 U.S.C. § 119(e) from U.S. Provisional Patent Application No. 62/171,385, entitled "Methods and Apparatus for High Dynamic Range Video Coding" filed on Jun. 5, 2015, which is incorporated by reference herein in its entirety.

BACKGROUND

The disclosure generally relates to the field of image and video compression, and more specifically to high dynamic range coding of digital images and videos.

Proliferation of display technology combined with bandwidth considerations prompts standardization of a format of image data and encoding/decoding thereof. Image data representing an image can be stored in a standardized format to allow electronic displays with different types or electronic displays from different manufactures to properly display the image. For example, image data conforming to ITU-R Rec. BT.709 standard may represent luminosity up to 100 nits, and include values of color components in a red-green-blue (RGB) color space. The image data conforming to conventional standard (e.g., ITU-R Rec. BT.709) can be encoded, and encoded data can be decoded using a standard codec (e.g., Main10 High Efficiency Video Coding (HEVC)) for transmission to another device.

Recent interests in the broadcast and related video communications industry have turned to high dynamic range image data that may represent imagery at much higher levels of luminosity, of at least 1,000 nits and potentially up to 10,000 nits, and with a much wider color gamut, given by the BT.2020 standard.

However, there is a lack of an efficient encoding and decoding process of the high dynamic range image data. Developing a dedicated encoding and decoding process for high dynamic range image data may be cost inefficient. In addition, such dedicated encoding and decoding process may not be compatible with standard dynamic range image data. A simple rescaling (or lowering) of a dynamic range in an attempt to utilize a conventional encoding and decoding process for standard dynamic range image data conforming to the conventional standard (e.g., ITU-R Rec. BT.709) may not be a viable solution. Assuming for an example, converting image data (or video data) capable of representing up to luminance of 1000 nits into 100 nits can be simply performed by dividing all samples by 10. However, such an approach may entail a loss of artistic intent or artistic details of the image (or the video), thereby degrading a quality of the image presented. How to regrade an image from one dynamic range to another while maintaining artistic intent or details is a challenging process.

Therefore, the high dynamic range image data having a higher dynamic range compared to the standard dynamic range image data cannot be processed in an efficient manner through a conventional encoding and decoding approach.

SUMMARY

One or more embodiments of a disclosed configuration include a system (or a computer implemented method or a non-transitory computer readable medium) for automatically preprocessing a higher dynamic range image data into a lower dynamic range image data through a data adaptive tuning process. In one example, the higher dynamic range image data may represent luminosity of at least 1000 nits, and even up to 10,000 nits. In one example, the lower dynamic range image data may be compatible with a standard dynamic range image data having a dynamic range capable of representing luminosity up to 100 nits; other examples range up to at most 500 nits. By automatically preprocessing the higher dynamic range image data into the lower dynamic range image data through the data adaptive tuning process, an existing encoding process for encoding the standard dynamic range image data can be applied to the lower dynamic range image data while preserving metadata sufficient to recover image fidelity even in the high dynamic range. In one aspect, the system (or a computer implemented method or a non-transitory computer readable medium) provides for backwards compatibility between high dynamic range video services and existing standard dynamic range services. In one aspect, regrading is applied in a domain that is perceptually more uniform than the domain in which it is initially presented.

In one or more embodiments, a method of encoding high-dynamic range image data is disclosed. The method includes converting the high-dynamic range image data represented in a red-green-blue (RGB) color space to a YUV color space; obtaining a luminance signal from the converted high-dynamic range image data; generating a smoothed luminance signal based on the luminance signal; generating a base signal based on the smoothed luminance signal, the smoothed luminance signal indicative of a surplus of the high-dynamic range image data over the base signal; generating a regraded base signal by performing adaptive monotonic nonlinear mapping with data adaptive tuning to the base signal; performing a color transformation on the regraded base signal; downsampling chroma components of the color transformed regraded base signal; encoding the downsampled signal to generate an encoded base signal; generating metadata describing the smoothed luminance signal; and generating a single stream including the encoded base signal and the metadata describing the smoothed luminance signal.

In another embodiment, the steps in the method are performed in a different order. In one embodiment, the base signal is color transformed by a color conversion and downsampled prior to the adaptive monotonic nonlinear mapping. In one embodiment, the conversion to YUV 4:2:0 format is performed prior to the adaptive monotonic nonlinear mapping. In one embodiment, the adaptive monotonic nonlinear mapping is applied after a conversion to YUV 4:2:2 format, and the downconversion to YUV 4:2:0 format is performed afterwards, to prepare for encoding.

In another embodiment, if an initial high dynamic range image data is presented in a format other than the linear light RGB data, the initial high dynamic range image data is first converted to linear light RGB data, and the disclosed method is applied. In another embodiment, if the initial high dynamic range image data is presented in linear light but in a YUV 4:2:2 format or 4:2:0 format, the format of the initial high dynamic range image data is maintained, and the method is adapted to that color format.

In one embodiment, generating the smoothed luminance signal comprises automatically determining a selected number of binsizes (i.e., sizes of bins) of a luminosity histogram of the smoothed luminance signal according to a luminance distribution characteristic of the luminance signal, and generating the luminosity histogram of the smoothed luminance signal according to the selected number of binsizes.

In one embodiment, generating the smoothed luminance signal includes three steps: transforming the luminance signal of the base signal based on an opto-electrical transfer function (OETF) to obtain an OETF luminance signal; performing a tone mapping on the transformed luminance signal based on the luminance distribution characteristic of the OETF luminance signal; and transforming the tone mapped OETF luminance signal based on an electro-optical transfer function (EOTF), the electro-optical transfer function being inverse to the OETF. In one embodiment, the tone mapping on the OETF luminance signal is either an OETF or a gamut function from BT.2020 or BT.709. In one embodiment, the tone mapping is an adaptive nonlinear function design based on statistics (e.g., mean, covariance) of the OETF luminance signal, and generated for example using piecewise polynomial approximations of the histogram of the luminance signal, and quantized into a finite number of bins. In one embodiment, the smoothed luminance signal can be generated by a piecewise polynomial function with a finite number of segments, by approximating each of the steps above.

In one embodiment, a similar data adaptive monotonic nonlinear process may be applied to the base signal. In some embodiments, one or more steps applied to the base signal may be different from generating the smoothed luminance signal.

In one embodiment, the standard codec is compliant with one of ITU/ISO/IEC HEVC/H.265, ITU/ISO/IEC AVC/H.264, ITU/ISO/IEC MPEG-2/H.262, Alliance for Open Media, Google VPX, and Xiph Theora coding standards.

In one or more embodiment, a method of encoding high-dynamic range image data is disclosed. The method comprises: converting the high-dynamic range image data represented in a red-green-blue (RGB) color space to a YUV color space; obtaining a luminance signal from the converted high-dynamic range image data; generating a smoothed luminance signal based on the luminance signal; generating a base signal based on the smoothed luminance signal, the smoothed luminance signal indicative of a surplus of the high-dynamic range image data over the base signal; performing a color transformation on the base signal; downsampling chroma components of the color transformed base signal; generating a regraded base signal by performing adaptive monotonic nonlinear mapping with data adaptive tuning to the downsampled base signal; encoding the regraded base signal to generate an encoded base signal; generating metadata describing the smoothed luminance signal; and generating a single stream including the encoded base signal and the metadata describing the smoothed luminance signal.

In one embodiment, performing the adaptive monotonic nonlinear mapping with the data adaptive tuning comprises: transforming a luminance component of the downsampled base signal based on an opto-electrical transfer function (OETF) to obtain an OETF luminance signal; performing a tone mapping on the transformed luminance signal based on a distribution characteristic of the OETF luminance signal; and transforming the tone mapped base signal based on an electro-optical transfer function, the electro-optical transfer function being inverse to the opto-electrical transfer function.

In one or more embodiments, a method of transmitting image data from a source device to a sink device is disclosed. The method includes: converting the image data represented in a red-green-blue (RGB) color space to a YUV color space; generating a smoothed luminance signal based on a luminance component of the converted image data; generating a base signal based on the smoothed luminance signal, the smoothed luminance signal indicative of a surplus in a dynamic range of the image data over the base signal; generating a regraded base signal by performing adaptive monotonic nonlinear mapping with data adaptive tuning based on the base signal; encoding the regraded base signal to generate a first stream; and transmitting the first stream to the sink device.

In one embodiment, generating the smoothed luminance signal is based on a luminance a distribution characteristic of the luminance component of the converted image data. In one embodiment, a selected number of binsizes of a luminosity histogram is automatically determined according to the luminance distribution characteristic of the luminance component, and generating the luminosity histogram of the smoothed luminance signal according to the selected number of binsizes.

In one embodiment, performing the adaptive monotonic nonlinear mapping with the data adaptive tuning is based on a sequence, GOP, frame, slice, or even block-level of the base signal.

In one embodiment, the smoothed luminance signal is encoded to generate metadata describing the smoothed luminance signal. The first stream may be generated by encoding the regraded base signal and adding the metadata to the encoded base signal.

In one embodiment, the smoothed luminance signal is encoded to generate a second stream different from the first stream, and the second stream is transmitted to the sink device.

In one embodiment, metadata including parameters used for generating the smoothed luminance signal is generated. The first stream may be generated by encoding the regraded base signal and adding the metadata to the encoded base signal. The parameters may include one of an input peak brightness, a target peak brightness, a number of bins, and binsizes that are adjusted according to the luminance component.

In one embodiment, the image data can represent up to 1000 nits, and the base signal can represent up to 100 nits. In another embodiment, the image data can represent up to 4000 nits, and wherein the base signal can represent up to 1000 nits. In one embodiment, the method allows changing the peak luminosity from a given value A to a given value B, where A>B or A<B. For example, A can be 4000, and B can be 500; or the other way.

In one embodiment, the base signal is generated by dividing the higher dynamic range image data represented in the RGB color space by the smoothed luminance signal. The base signal and the regraded base signal may be represented in the RGB color space. The regraded base signal represented in the RGB color space may be converted into the YUV color space prior to the encoding to obtain the first stream.

In one embodiment, the base signal is generated by dividing the converted higher dynamic range image data represented in the YUV color space by the smoothed luminance signal. The base signal and the regraded base signal may be represented in the YUV color space.

One or more embodiments of the disclosed configuration include a system (or a computer implemented method or a non-transitory computer readable medium) for automatically postprocessing lower dynamic range image data into high dynamic range image data. By automatically postprocessing the lower dynamic range image data into the higher dynamic range image data, an existing encoding process (e.g., HEVC) for decoding standard dynamic range image data can be applied to the lower dynamic range image data for presentation of the high dynamic range image data at a display device.

In one or more embodiments, a method of generating high-dynamic range image data is disclosed. The method includes steps of: decoding a single stream to obtain a downsampled base signal and metadata indicative of a smoothed luminance signal through a standard codec for decoding encoded data into standard dynamic range image data, a first dynamic range of the high-dynamic range image data higher than a second dynamic range of the standard dynamic range image data, the smoothed luminance signal indicative of a surplus of the first dynamic range of the high-dynamic range image data over the second dynamic range of the standard dynamic range image data; upsampling the downsampled base signal to obtain an unsampled base signal; converting the upsampled base signal represented in a YUV color space to a RGB color space; performing inverse adaptive monotonic nonlinear mapping with data adaptive tuning to the upsampled base signal to obtain the base signal, the base signal having a dynamic range equal to the second dynamic range of the standard dynamic range image data; obtaining a smoothed luminance signal based on the metadata indicative of the smoothed luminance signal and a luminance component of the upsampled based signal; and generating the high-dynamic range image data based on the base signal and the smoothed luminance signal.

In one or more embodiments, a method of generating image data is disclosed. The method includes steps of: receiving a first stream; decoding the first stream to obtain a downsampled base signal; obtaining a regraded base signal based on the downsampled base signal; generating a base signal by performing inverse adaptive monotonic nonlinear mapping with data adaptive tuning to the regraded base signal; obtaining a smoothed luminance signal, the smoothed luminance signal indicative of a surplus in a dynamic range of the image data over the base signal; and generating the image data represented in a red-green-blue (RGB) color space based on the base signal and the smoothed luminance signal.

In one embodiment, a second stream different from the first stream can be received. The smoothed luminance may be obtained by decoding the second stream.

In one embodiment, the smoothed luminance signal is obtained by obtaining metadata describing parameters for generating the smoothed luminance signal, and generating the smoothed luminance signal based on the parameters.

Despite one or more embodiments disclosed herein relate to encoding and decoding for high dynamic range image data, similar principles can be applied to encoding and decoding high dynamic range video data.

DETAILED DESCRIPTION

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

Example Image Encoding/Decoding System

Figure 1:
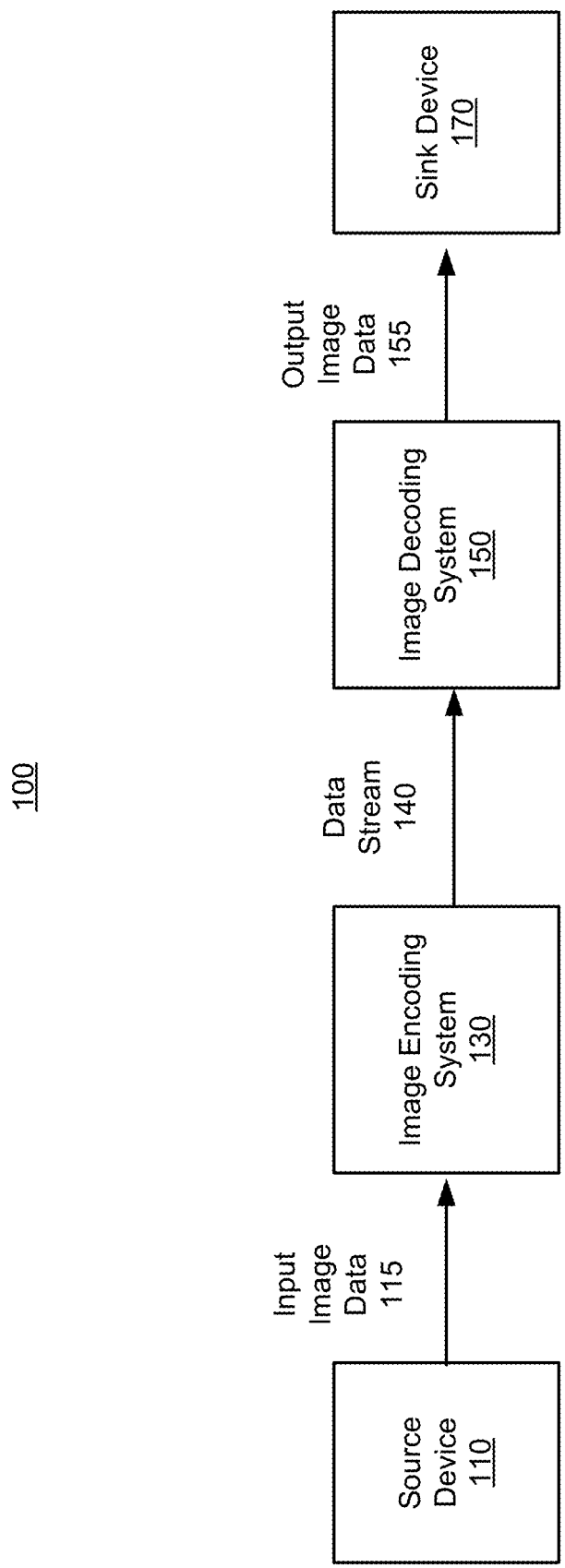
FIG. 1 is a block diagram of an image communication system according to one embodiment.

FIG. 1 is a block diagram of an image presentation system 100 according to one embodiment. In one embodiment, the image presentation system 100 includes a source device 110, an image encoding system 130, an image decoding system 150, and a sink device 170. Each of these components can be implemented in hardware, software, firmware, or a combination thereof. In some embodiments, the source device 110, the image encoding system 130, the image decoding system 150, and the sink device 170 are implemented in a single hardware system (e.g., a computing machine). In some embodiments, one or more of the source device 110, the image encoding system 130, the image decoding system 150, and the sink device 170 are implemented as separate computing machines and connected through a cable. In alternative embodiments, different and/or additional components may be included or some components may be omitted. In alternative embodiments, such components are connected through a network, such as Internet, satellite, cable, and other networks.

The source device 110 generates input image data 115 and transmits the input image data 115 to the image encoding system 130. The image encoding system 130 receives the input image data 115 from the source device 110, and encodes the input image data 115 to generate one or more data streams 140. The image decoding system 150 receives the one or more data streams 140 from the image encoding system 130, and decodes the one or more data streams 140 to generate output image data 155. The sink device 170 receives the output image data 155 and visually presents an image to a user.

The image encoding system 130 performs preprocessing on the input image data 115, which has a first dynamic range of an image component (e.g., luminosity or a color gamut), and encodes the preprocessed input image data through an encoding process to generate an intermediate image data, which has a second dynamic range lower than the first dynamic range. Similarly, the image decoding system 150 receives the one or more data streams 140, and decodes the one or more data streams 140 through an image decoding process, which regenerates the intermediate image data having the second dynamic range and generates the output image data 155, and then performs postprocessing on the decoded one or more data streams to generate the output image data having the first dynamic range. Detailed structures and operations of the image encoding system 130 and the image decoding system 150 are described in detail with respect to FIGS. 2 through 7 below.

In one embodiment, the input image data 115 and the output image data 155 are high dynamic range image data capable of displaying luminosity of at least 1,000 nits and potentially up to 10,000 nits, while the intermediate image data are capable of displaying luminosity within a maximum allowable luminosity of the standard dynamic range image data (e.g., 100 nits). For example, the high dynamic range image data conforms to BT.2020 standard, and the standard dynamic range image data conforms to BT.709. In this embodiment, the image encoding system 130 performs preprocessing on the input image data 115 to obtain the intermediate image data compatible with the standard dynamic range image data, and the image encoding system 130 performs encoding through a conventional encoding process through a standard codec (e.g., Main10 High Efficiency Video Coding (HEVC)) to generate one or more data streams 140. Similarly, the image decoding system 150 performs decoding through a conventional encoding process through a standard codec (e.g., HEVC) on the one or more data streams 140 to reconstruct the intermediate image data compatible with the standard dynamic range image data, and performs postprocessing on the reconstructed intermediate image data to generate the output image data 155.

In one embodiment, the image encoding system 130 transmits two data streams 140 including a first data stream 140A and a second data stream 140B to the image decoding system 150. In one embodiment, the first data stream 140A includes encoded data corresponding to a first image data including color information having a lower dynamic range than a dynamic range of the input image data 115, and the second data stream 140B includes encoded data corresponding to a second image data in grayscale indicative of a surplus of the dynamic range of the input image data 115 over the lower dynamic range of the first image data. Based on the first image data and the second image data received through the first data stream 140A and the second data stream 140B respectively, the image decoding system 150 can generate the output image data 155 having the dynamic range of the input image data 115.

In another embodiment, the image encoding system 130 transmits a single data stream 140 including the first data stream 140A to the image decoding system 150 without transmitting the second data stream 140B. In one embodiment, the second image data in the grayscale can be encoded and added to first data stream 140A. The image decoding system 150 can decode the first data stream 140A including the encoded first image data and the encoded second image data, and generates the output image data 155 based on the decoded first image data and the decoded second image data obtained through the single data stream 140. Yet in another embodiment, the image encoding system 130 adds metadata to the first data stream 140A. The metadata include information or parameters used for generating the second image data at the image encoding system 130. Based on the metadata and the first image data obtained through the first data stream 140A, the image decoding system 150 can generate (or infer) the second image data, and further generate the output image data 155 based on the first image data and the second image data. Accordingly, the second data stream 140B need not be transmitted, thus bandwidth of information exchanged between the image encoding system 130 and the image decoding system 150 can be conserved.

Figure 2A:
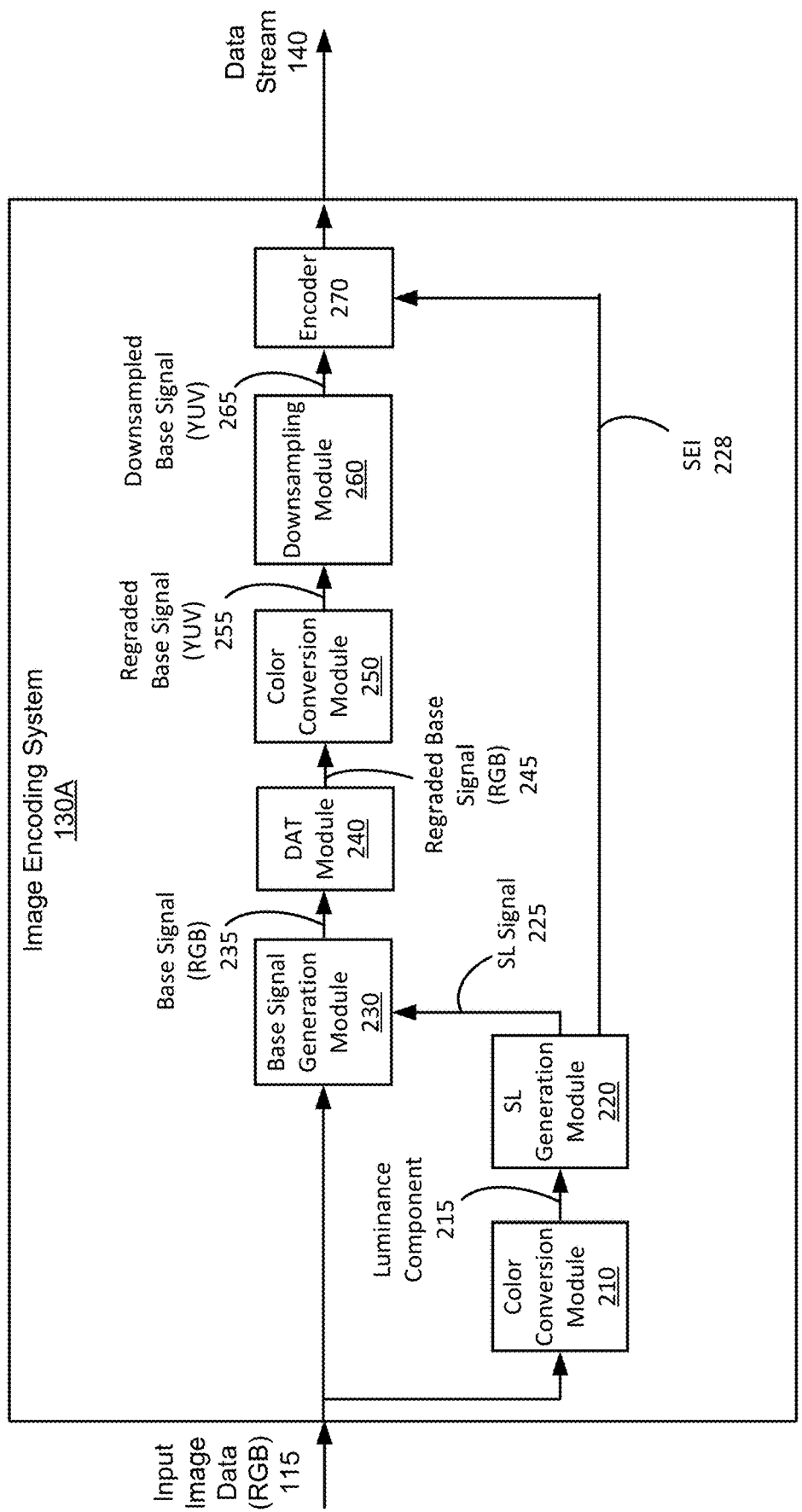
FIG. 2A illustrates an image encoding system according to one embodiment.

FIG. 2A illustrates an image encoding system 130A according to one embodiment. In this embodiment, the image encoding system 130A receives the input image data 115 and generates a single data stream 140. The data stream 140 is a stream of bits corresponding to a signal or image data having a lower dynamic range of an image component (e.g., luminosity or a color gamut) than a dynamic range of the input image data 115. In one aspect, the image encoding system 130A implements the color conversion module 210, a smoothed luminance (SL) generation module 220, a base signal generation module 230, a data adaptive tuning (DAT) module 240, a color conversion module 250, a downsampling module 260, and an encoder 270. These components can be implemented as hardware, software, firmware, or a combination thereof. In alternative embodiments, different and/or additional components may be included or some components may be omitted.

The color conversion module 210 receives the input image data 115 and extracts a luminance component of the input image data 115. In one aspect, the input image data 115 is a high dynamic range image data represented in the RGB color space. The color conversion module 210 performs color conversion to convert the input image data represented in the RGB color space into a YUV color space, and then outputs a luminance component 215 of the converted image data. In one example, the YUV color space is a YCbCr color space, a YFbFr color space, or some derivation thereof (e.g., Y'CbCr). The YFbFr color space is a color space obtained through a number of lossless integer color transforms, using lifting steps, which are especially effective and efficient to implement. Details of the YFbFr color space are disclosed in U.S. patent application Publication Ser. No. 14/226,680 ("ACTED"), and U.S. Pat. No. RE40081, which are incorporated herein in their entirety.

In one embodiment, the color transform may be adaptive to input data, with the adaptation taking place at the sequence, GOP, frame, slice, or even block-level. The selection can be made for example by measuring the decorrelation efficiency on the input data (according to a measure such as coding gain, or by actually coding the data and using rate-distortion analysis). If the color transforms are selected from a small table, one can signal the selection by a simple index in the metadata in the bitstream.

Figure 3A:
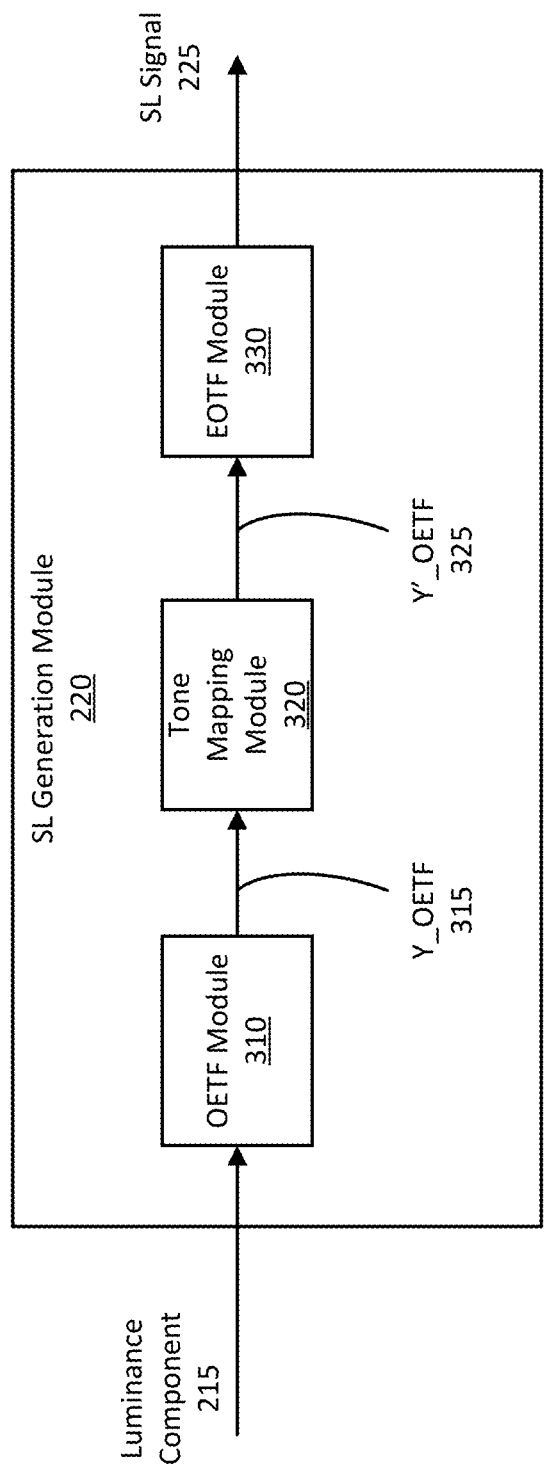
FIG. 3A illustrates a smoothed luminance generation module of the image encoding system according to one embodiment.

The SL generation module 220 receives the luminance component 215 from the color conversion module 210 and generates the SL signal 225. In one aspect, the smoothed luminance (SL) signal 225 is an intensity-only signal (or grayscale image data), which in some embodiments contains the low frequency intensity information of the input image data 115, or a graded version of the luminance. In some embodiments, the SL signal 225 is generated by performing non-linear mapping on the luminance component 215. In one example, as depicted in FIG. 3A, the SL generation module 220 applies a series of operations to the luminance component 215 including: applying an OETF, applying a monotonically increasing nonlinear function, applying an EOTF. Such a combination of operations permits creating a method to regrade the initial high dynamic range image data into standard dynamic range data (or more generally, creating image data with a different peak luminosity), while working in a perceptually more uniform domain. This allows the regrading to appear more natural and consistent. Components of this process, or the entire process, may be computed by a piecewise polynomial function of finite steps.

The base signal generation module 230 receives the input image data 115 and the SL signal 225, and generates the base signal 235. The base signal 235 is a signal or image data having a lower dynamic range than the input image data. In one aspect, the base signal 235 is compatible with the standard dynamic range image data capable of representing up to 100 nits, hence the base signal 235 may be displayed through by a standard dynamic range display device. In the embodiment shown in FIG. 2A, the base signal generation module 230 generates the base signal 235 represented in the RGB color space. Specifically, the base signal generation module 230 generates the base signal 235 by dividing the input image data 115 represented in the RGB color space by the SL signal 225. That is, each color component (RGB) of the base signal 235 is divided by the SL signal 225. Hence, the input image data 115 can be represented as the following Equation (1):

$$RGB_{HDR} = SL*B \qquad (1)$$

where $RGB_{HDR}$ corresponds to values of the input image data 115 (for red, green, blue components), SL corresponds to the SL signal 225, and B corresponds to the base signal 235 of red, green, blue color components. In one aspect, the SL signal 225 represents a surplus of the first dynamic range of the input image data 115 over the second dynamic range of the lower dynamic range image data or the base signal.

The DAT module 240 receives the base signal 235 from the base signal generation module 230, and performs adaptive monotonic nonlinear mapping with data adaptive tuning to the base signal 235 to generate a regraded base signal 255. In the embodiment shown in FIG. 2A, the DAT module 240 receives the base signal 255 in the RGB color space, and performs adaptive monotonic nonlinear mapping with data adaptive tuning in the RGB color space to generate the regraded base signal 245 in the RGB color space. In some embodiments, the regraded base signal 255 is generated by performing a nonlinear mapping on the base signal 235, and applying data-adaptive tuning. In one example, the DAT module 240 applies a monotonically increasing nonlinear function to the base signal 235 to improve the naturalness and consistency of the regraded imagery with respect to the higher luminosity signal. In one approach, the DAT module 240 measures statistics on the base signal 255 (e.g., a histogram of the luminosity component), and performs adaptive monotonic nonlinear mapping based on the measured statistics of the base signal 255. In some embodiments, the data adaptive tuning performed by the DAT module 240 can be implemented in a similar manner as the SL generation module 220.

The color conversion module 250 receives the regraded base signal 255 represented in the RGB color space, and performs color conversion to obtain the regraded base signal 255 represented in the YUV color space. In one embodiment, the color conversion modules 210 and 250 perform a same type of color conversion. Alternatively, the color conversion module 210 may extract only the luminance component 215, while the color conversion module 250 converts all image components (e.g., RGB values) in one color space into all image components (e.g., YUV values) in another color space.

The downsampling module 260 receives the regraded base signal 255 and downsamples the regraded base signal 255 to generate a downsampled base signal 265. In the embodiment shown in FIG. 2A, the downsampling module 260 receives the regraded base signal 255 represented in the YUV color space, and performs downsampling in the YUV color space to generate the downsampled base signal 265 represented in the YUV color space. In one embodiment, the downsampling module 260 downsamples the chroma components (i.e., color components) of the regraded base signal 255, but not the luminance component of the regraded base signal 255. In one embodiment, the downsampling module 260 downsamples the regraded base signal 255 in a YUV 4:4:4 format to a YUV 4:2:2 format (i.e., downsamples horizontally, but not vertically). In another embodiment, the downsampling module 260 downsamples to the regraded base signal 255 in the YUV 4:4:4 format to the YUV 4:2:0 format (i.e., it downsamples in both directions).

Note that in some embodiments, the DAT module 240 may be interspersed in between these conversions; that is, the DAT module 240 may be applied in any of the domains: YUV 4:4:4, YUV 4:2:2, or YUV 4:2:0. Likewise, the encoder 270 may be capable of encoding any of YUV 4:4:4, YUV 4:2:2, or YUV 4:2:0.

In one embodiment, the filters implemented by the downsampling module 260 are adaptive to input data, with the adaptation taking place at the sequence, GOP, frame, slice, or even block-level. The selection can be made, for example, by measuring the reconstruction fidelity (according to a measure such as peak signal-to-noise ratio (PSNR), with many others available) of the signal after consecutively down and up sampling, or by actually coding the data and using rate-distortion analysis. If the resampling filters are selected from a small table, the selection can be indicated by a simple index in the metadata in the data stream 140.

In one implementation, the downsampling module 260 includes one or more filters to downsample the regraded base signal 255. Given a discrete filter x[n], M unique phases of filter x can be obtained by downsampling x by M. For example, when M=2, there are two phases, which can be labeled as the 0-phase and the 1-phase; the 0-phase of the discrete filter x[n] is x[2n], and the 1-phase of x[n] is x[2n+1]. In this configuration, the other phases can be derived from the zero phase by non-unique interpolation. As a specific example, a standard grid for resampling in chroma from a 4:4:4 format to a 4:2:0 format, as practiced in both AVC and HEVC, requires the use of 4-phase resampling. As a concrete example, suppose the zero-phase 2N+1 tap horizontal down sampling filter is hd[n], where n=−N, . . . , −1, 0, 1, . . . N. Then the 1-phase vertical down sampling filter vd[n] can be derived by interpolating hd[n] by a factor of 2 using spline interpolation method to get d[n], where hd[n]= hd[2n], for n=−N, . . . , −1, 0, 1, . . . N. The horizontal down sampling filter is the 0-0 phase filter of hd2[n], and the vertical down sampling filter is the 1-phase filter of hd2[n], where vd[n]=hd2[2n+1], for n=-N, ..., -1, 0, 1, ... N. Examples of filter values are provided in Table 1 below.

TABLE 1

Example Filter Values

Hd (+8.0, 0.0, −64.0, +128.0, +368.0, +128.0, −64.0, 0.0, +8.0)/256
D ((+8.0, +8.0, 0.0, 0.0, −24.0, −64.0, +48.0, +128.0, +224.0, +368.0, +224.0, +128.0, +48.0, −64.0, −24.0, 0.0, 0.0, +8.0, +8.0)/256
Vd (+8.0, 0.0, −24.0, +48.0, +224.0, +224.0, +48.0, −24.0, +0.0, +8.0)/ 256

In one embodiment, the downsampling module 260 includes a horizontal downsampling filter for downsampling the regraded base signal 255 in the 4:4:4 format down to a 4:2:2 format, and a vertical downsampling filter for downsampling the downsampled signal in the 4:2:2 format down to the 4:2:0 format. The vertical downsampling filter may be a phase shifted version of the horizontal downsampling filter. Hence, the regraded base signal 255 represented in the 4:4:4 format can be downsampled to obtain the downsampled base signal represented the 4:2:0 format. Example coefficients of the horizontal downsampling filter is listed in Table 2, and example coefficients of the vertical downsampling filter is listed in Table 3.

TABLE 2

Example Horizontal Downsampling Filter Coefficients (4:4:4 to 4:2:2)

| | | | | | Tap k | | | | | |
|---|---|---|---|---|---|---|---|---|---|---|
| −5 | −4 | −3 | −2 | −1 | 0 | 1 | 2 | 3 | 4 | 5 |
| Coefs c1 [k] 1 | 0 | −3 | 0 | 10 | 16 | 10 | 0 | −3 | 0 | 1 |

TABLE 3

Example Vertical Downsampling Filter Coefficients (4:2:2 to 4:2:0)

| | | | | | Tap k | | | | | | |
|---|---|---|---|---|---|---|---|---|---|---|---|
| −5 | −4 | −3 | −2 | −1 | 0 | 1 | 2 | 3 | 4 | 5 | 6 |
| Coefs c2 [k] 9 | 13 | −27 | −42 | 75 | 228 | 228 | 75 | −42 | −27 | 13 | 9 |

The encoder 270 receives the downsampled base signal 265 from the downsampling module 260, and generates an encoded base signal 275A. The encoder 270 can implement a standard codec (e.g., ITU/ISO/IEC HEVC/H.265, ITU/ISO/IEC AVC/H.264, ITU/ISO/IEC MPEG-2/H.262, Alliance for Open Media, Google VPX, and Xiph Theora, etc.) for encoding standard dynamic range image data. The encoder 270 can also implement other codecs for encoding image data having a lower dynamic range than a dynamic range of the input image data 115. In one embodiment, the encoder 270 generates the data stream 140 by encoding the downsampled base signal 265 using the codec and adding metadata in the supplemental enhancement information (SEI) 228 indicative of parameters used in the SL generation module 220 for generating the SL signal 225, and also metadata describing parameters used in the DAT module 240 for generating the regraded base signal 245 to the encoded downsampled base signal 265. By integrating the SEI 228 with the encoded base signal, bandwidth of information transmitted to the image decoding system 150 can be greatly reduced, while still allowing full reconstruction of the high dynamic range data.

In alternative embodiment, an additional encoder is implemented in the image encoding system 130A to encode the SL signal 225. The encoded SL signal can be combined with the encoded base signal again as metadata in an SEI, and transmitted to the image decoding system 150 through the single data stream 140. This requires only a slightly higher bandwidth (about 1% higher) then a method in which the SL is derived, but provides for a more precise recovery of the SL signal, and reconstruction of the HDR signal.

Figure 2B:
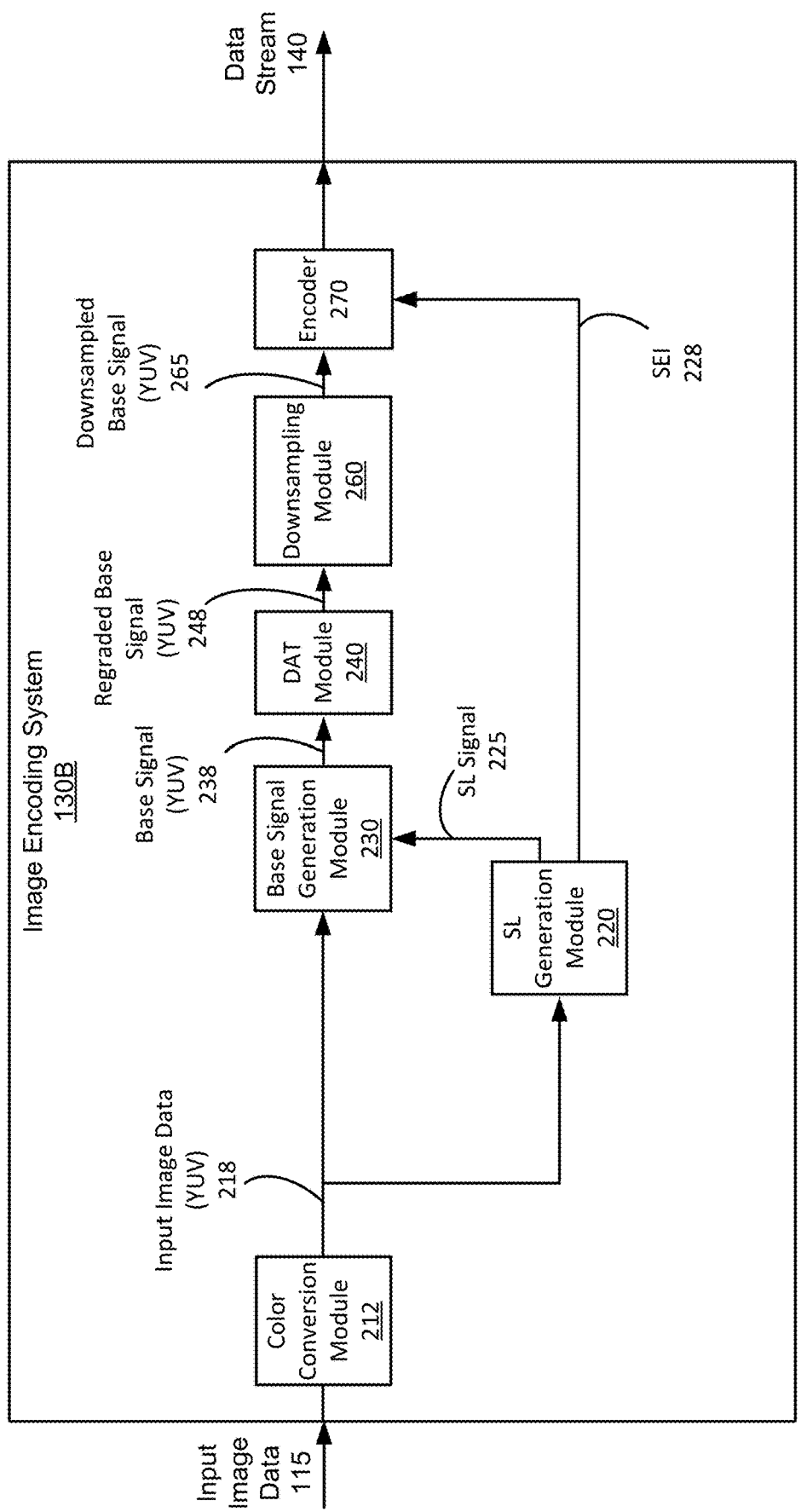
FIG. 2B illustrates an image encoding system according to another embodiment.

FIG. 2B illustrates an image encoding system 130B according to another embodiment. The image encoding system 130B receives the input image data 115 and generates the data stream 140. In the embodiment shown in FIG. 2B, the encoding system 130B includes a single color conversion module 212, the SL generation module 220, the base signal generation module 230, the DAT module 240, the downsampling module 260, and the encoder 270. The configurations of these components are similar to the ones shown in FIG. 2A, except that a single color conversion module 212 is implemented instead of the color conversion modules 210, 250 of FIG. 2A.

Specifically in the embodiment shown in FIG. 2B, an output of the color conversion module 212 is directly coupled to an input of the base signal generation module 230 and an input of the SL generation module 220. Hence, the base signal generation module 230 receives the input image data 218 represented in the YUV color space, and obtains the base signal 238 represented in the YUV color space. In one aspect, the base signal 238 can be obtained according to the following Equation (2):

$$Y_{SDR} = \frac{Y_{HDR}}{Y\_SL}, Cb_{SDR} = \frac{Cb_{HDR}}{Cb\_SL}, Cr_{SDR} = \frac{Cr_{HDR}}{Cr\_SL} \quad (2)$$

where $Y_{HDR}$ is a luminance component of the input image data 218 represented in the YUV color space, $Cb_{HDR}$ is a blue difference chroma component of the input image data 218 represented in the YUV color space, $Cr_{HDR}$ is a red difference chroma component of the input image data 218 represented in the YUV color space. In this embodiment, the Y_SL, Cb_SL, and Cr_SL, are new components that can be functionally derived from the previously computed SL signal; this is designed to allow a slightly difference regrading in chroma than luma if desired; if all are set to equal SL, this reduces to the previous approach. Y_SL can be a luminance component of the SL signal 225, Cb_SL can be a derived blue difference chroma component of the SL signal 225, and Cr_SL can be a derived red difference component of the SL signal 225. $Y_{SDR}$ is a luminance component of the base signal 238 represented in the YUV color space, $Cb_{SDR}$ is a blue difference chroma component of the base signal 238 represented in the YUV color space, and $Cr_{SDR}$ is a red difference chroma component of the base signal 238 represented in the YUV color space. In some embodiments, the Cb_SL and Cr_SL can be replaced with Y_SL as before.

The remaining components (e.g., the SL generation module 220, the downsampling module 260, the DAT module 240, and the encoder 270) operate as shown in FIG. 2A. Therefore, the detailed description thereof is omitted herein for the sake of brevity.

Figure 2C:
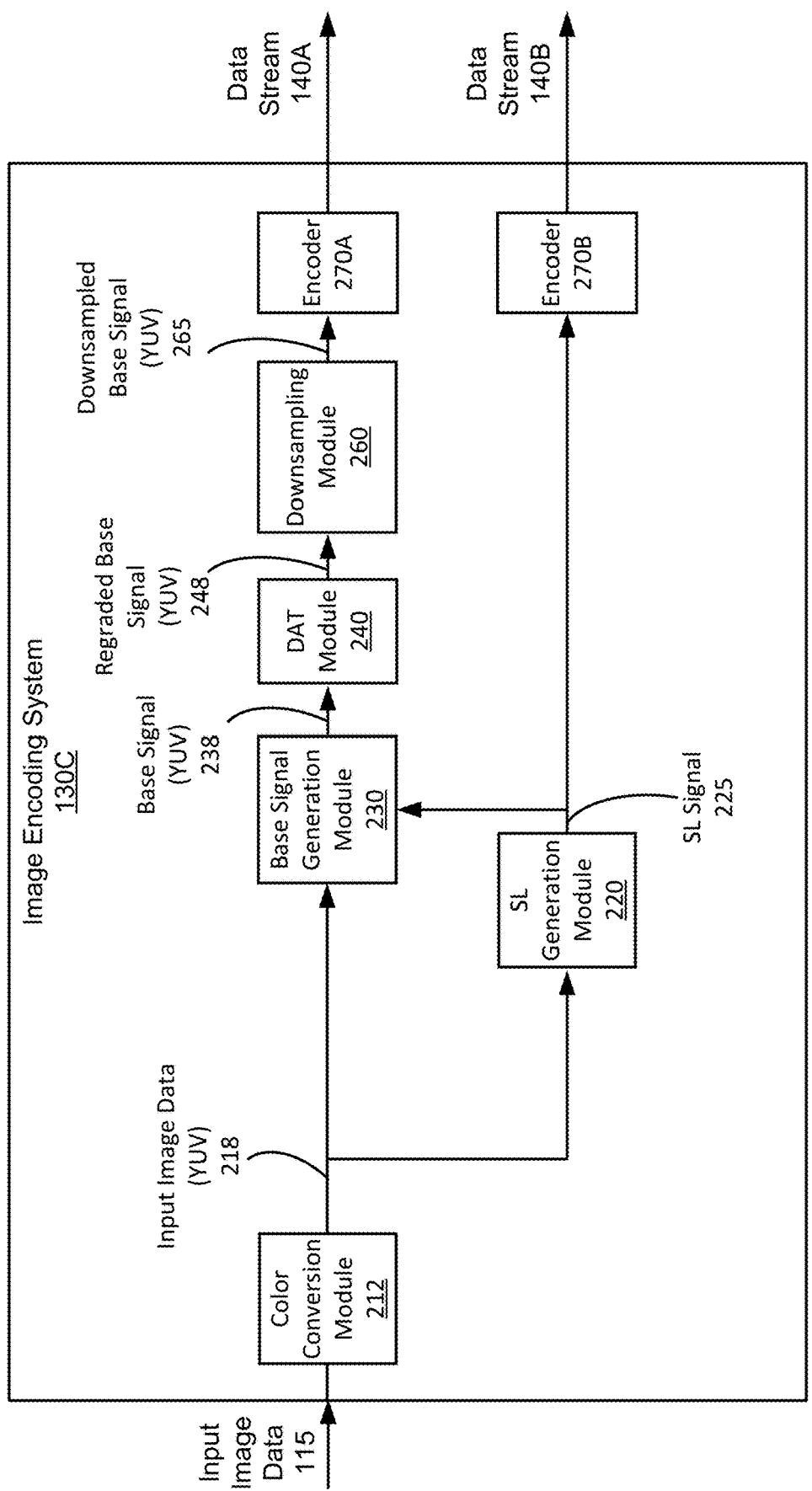
FIG. 2C illustrates an image encoding system according to another embodiment.

FIG. 2C illustrates an image encoding system 130C according to another embodiment. In this embodiment, the image encoding system 130C receives the input image data 115 and generates dual data streams 140. In the embodiment shown in FIG. 2C, the encoding system 130B includes the color conversion module 212, the SL generation module 220, the base signal generation module 230, the DAT module 240, the downsampling module 260, and encoders 270A, 270B. The configurations of these components are similar to the ones shown in FIG. 2B, except that two encoders 270A, 270B generate two data streams 140A, 140B. These two streams can be combined into one stream according to a scalable coding architecture, or remain as two separate streams.

The encoder 270A receives the downsampled base signal 265 from the downsampling module 260, and generates the data stream 140A. In one embodiment, the encoder 270A implements a standard codec (e.g., ITU/ISO/IEC HEVC/H.265, ITU/ISO/IEC AVC/H.264, ITU/ISO/IEC MPEG-2/H.262, Alliance for Open Media, Google VPX, and Xiph Theora, etc.) for encoding standard dynamic range image data. In some embodiments, the encoder 270A implements other codecs for encoding image data having a lower dynamic range than a dynamic range of the input image data 115.

The encoder 270B receives the SL signal 225 from the SL generation module 220 and encodes the SL signal 225 to generate the data stream 140B. In one implementation, the data stream 140B includes encoded SL signal. In one embodiment, the encoder 270B implements the same standard codec implemented by the encoder 270A. In another embodiment, the encoder 270B implements a codec customized for encoding the SL signal 225 different from the standard codec implemented by the encoder 270A.

FIG. 3A illustrates the SL generation module 220 of the image encoding system 130 according to one embodiment. In one embodiment, the SL generation module 220 includes an OETF module 310, a tone mapping module 320, and an electro-optical transfer function (EOTF) module 330. These components operate together to receive the luminance component 215 and generate the SL signal 225 based on the luminance component 215. In one aspect, the SL generation module 220 applies adaptive techniques for generating and scaling the SL signal 225. These components can be implemented as hardware, software, firmware, or a combination thereof. In alternative embodiments, different and/or additional components may be included or some components may be omitted.

The OETF module 310 receives the luminance component 215 and applies a transfer function for transforming the luminance component 215 represented in a linear luminance domain into a non-linear luminance domain prior to performing non-linear mapping. In one embodiment, the OETF module 310 applies a transfer function such as the SMPTE (Society for Motion Picture and Television Engineers) standards ST-2084 (PQ TF) or the Philips TF (potentially part of ST-2094.20). In another embodiment, the OETF module 310 applies a transfer function as shown in Equation (3) below:

$$Y_{OETF}=\log((Rho-1)*powf(Y,(1/2.40))+1)/\log(Rho), \quad (3)$$

where ho=32.0*powf((InputPeakBrightness/TgtPeakBrightness), (1/2.40))+1.

The InputPeakBrightness is a peak brightness (e.g., 1,000 nits) of the input image data 115 or the luminance component 215 automatically measured, for example by the OETF module 310. The TargetPeakBrightness is a target peak brightness is a parameter in the transfer process, and may for example be selected as the desired output peak brightness value (e.g., 100 nits, starting with 1000 nits input). By measuring the InputPeakBrightness, the transformation of the luminance component 215 can be performed in an adaptive manner, to achieve a more natural, data-appropriate transfer function.

Yet in another embodiment, the OETF module 310 applies a transfer function as shown in Equation (4) below:

$$Y_{OETF} = \qquad (4)$$
$$powf(((c2*powf(Y,m1)+c1)/(1.0+c3*powf(Y,m1))),m2),$$

where $$powf(a,b)=a^b,$$

$$m1=(2610.0)/(4096.0*4.0),$$

$$m2=\left(\frac{(2523.0*128.0)}{4096}\right)*\left(1+0.25*\log\left(\frac{TgtPeakBrightness}{InputPeakBrightness}\right)\right),$$

$$c1=(3424.0)/4096.0,$$

$$c2=(2413.0*32.0)/4096.0, \text{ and}$$

$$c3=(2392.0*32.0)/4096.0.$$

In addition, Data-Adaptive Tuning (DAT) can be applied to the transfer function, which uses statistics of the data to improve coding. By applying DAT, the OETF module 310 generates the transformed luminance signal Y_OETF 315. In some embodiments, both the method of tuning (e.g., which TF function to use, and whether additional nonlinear functions are applied), and the frequency of tuning, whether applied at the sequence, GOP, frame-level, or even slice or block-level may be varied in complexity.

The tone mapping module 320 receives the transformed luminance signal Y_OETF 315 from the OETF module 310 and performs non-linear mapping on the transformed luminance signal Y_OETF 315. Specifically, the tone mapping module 320 controls the dynamic range of the input and the output of the tone mapping. For example, the tone mapping module 320 applies a polynomial mapping represented as a power function shown in Equation (5) below:

$$y=(a*x+b)^\alpha, \qquad (5)$$

where x corresponds to transformed luminance signal Y_OETF 315, and y is the mapped luminance signal Y'_OETF 325. For simplicity, a piecewise-linear model with L pieces can be applied, where L>=1. For each piece, Equation (6) reduces to:

$$y=a(k)*x+b(k), k=0,1,\ldots,(L-1) \qquad (6)$$

where, k represents the $k^{th}$ piece or bin. These equations are applied to the transformed luminance signal Y_OETF 315 as input x to generate the mapped luminance signal Y'_OETF 325.

Figure 3B:
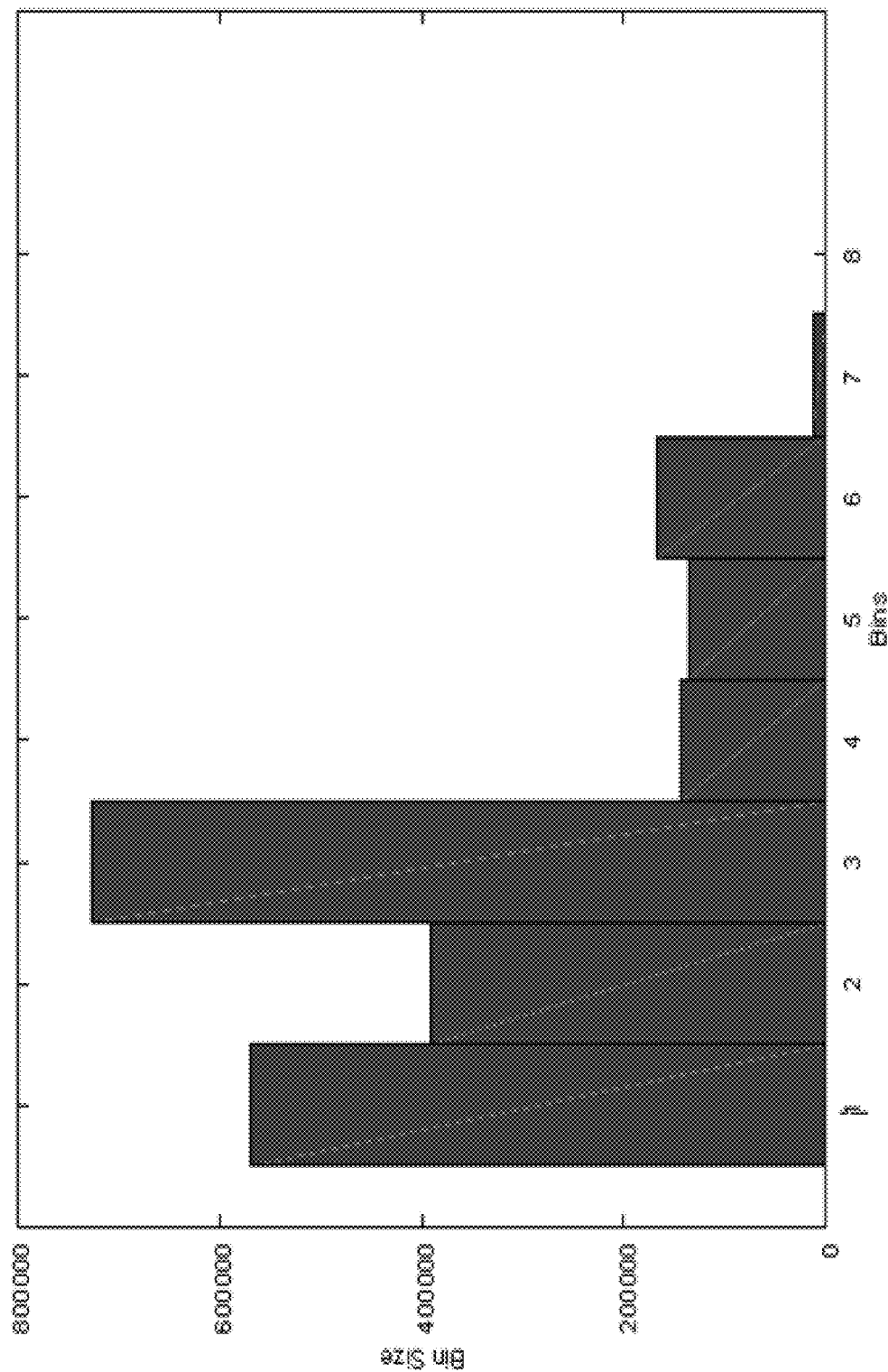
FIG. 3B illustrates an example binned histogram of an image before data adaptive tuning according to one embodiment.
Figure 3C:
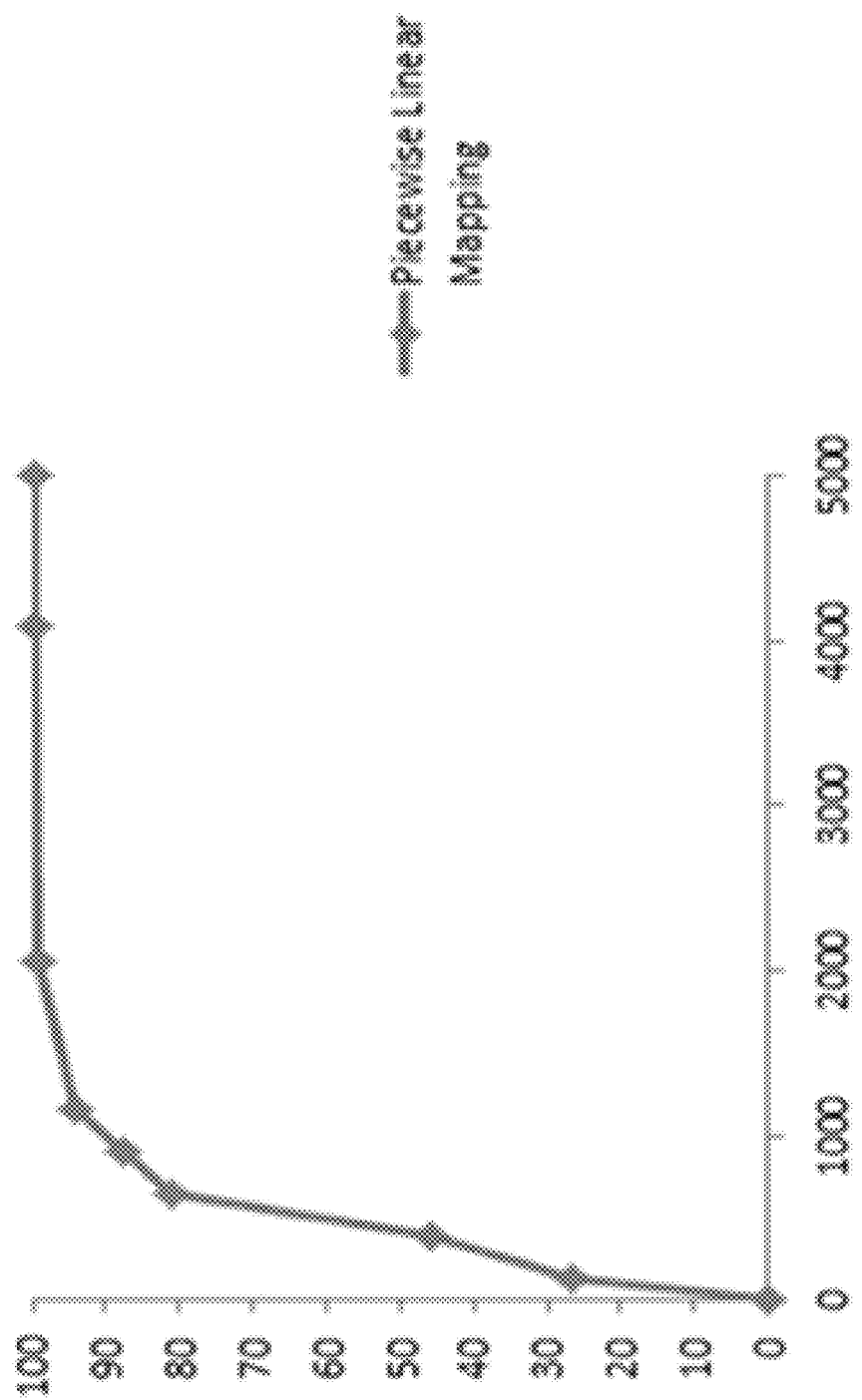
FIG. 3C illustrates an example piecewise linear mapping of an image according to the histogram in FIG. 3B.

In one embodiment, the coefficients a(k), b(k) in the Equation (6) above are sequence dependent and are derived based on the distribution characteristics of the HDR input signal. In one example, the tone mapping module 320 determines the coefficients a(k), b(k) based on a histogram analysis. For example, the transformed luminance signal Y_OETF 315 is segmented to L bins, and a count is obtained for the number of pixels in each bin (which we call binsize). FIG. 3B illustrates an example luminosity histogram of a luminance image before data adaptive tuning, where a luminance of transformed luminance signal Y_OETF 315 is divided into an example 8 bins. Under an optimization process, the number of bins and their respective sizes are automatically determined according to an input data such that the lower and mid tone levels have an improved representation compared to the unadjusted transfer function representation. Thus, the coefficients a(k), b(k) can be determined as shown in Equation (7) below:

$$a(k) = \left(\frac{binsize_k}{NumTotPixels}\right) * \tag{7}$$
$$(MAX\_DISPLAY\_LUMA/MAX\_LUMA\_BIN_k)$$
$$b(0) = 0$$
$$b(k) = a(k-1) * MAX\_LUMA\_BIN_{k-1} +$$
$$b(k-1) - a(k) * MAX\_LUMA\_BIN_{k-1}$$

where $MAX\_LUMA\_BIN_k$ is the maximum luminance value of the transformed luminance signal Y_OETF 315 in bin k, and $binsize_k$ is the number of pixels in bin k. The piecewise linear DAT function corresponding to FIG. 3B is given in FIG. 3C. In one approach, the numbers $binsize_k$ are sent in the data stream 140 as metadata (e.g., SEI 275B of FIG. 2C). In another approach, these numbers are indexed, and only an index is sent for each number. In one embodiment, this DAT can easily be applied at the sequence, GOP, frame, slice, or block level.

The EOTF module 330 receives the mapped luminance signal Y'_OETF 325 from the tone mapping module 320, and generates the SL signal 225. In one embodiment, the EOTF module 330 converts the mapped luminance signal Y'_OETF 325 represented in a perceptual luminance domain into a linear luminance domain. In one example, the EOTF module 330 obtains the SL signal 225 according to Equation (8) below:

$$SL = Y/TL, \tag{8}$$

where SL corresponds to the SL signal 225, Y corresponds to the luminance component 215, and TL is an intermediate signal for generating the SL signal 225 based on the luminance component 215. In case the OETF module 310 implements the transfer function as shown in equation (3), the EOTF module 330 produces the intermediate signal TL as shown in an equation (9) below:

$$TL = powf((powf(Rho, Y'_{OETF})-1)/(Rho-1), 2.40). \tag{9}$$

In case the OETF module 310 implements the transfer function as shown in Equation (4), the EOTF module 330 produces a TL as shown in Equation (10) below:

$$TL = powf\left(\frac{Max\left(0.0, powf\left(Y'_{OETF}, \frac{1.0}{m2}\right) - c1\right)}{c2 - c3 * powf\left(Y'_{OETF}, \frac{1.0}{m2}\right)}, \frac{1.0}{m1}\right). \tag{10}$$

where Max(a,b) returns a if a>b, else b.

In one embodiment, the SL generation module 220 obtains the SL signal 225 by a smoothing process on the input luminance component 215. In one embodiment, the SL signal 225 is obtained as a linear combination of a pre-defined shaped function. As an example, a 2D Gaussian function can be employed, because the impulse response of many natural and manmade systems is Gaussian. The individual shape functions are then mathematically built as a partition of unity. In another embodiment, the SL signal 225 is obtained by applying a smoothing filter (again such as by a 2D Gaussian) to the luminance component 215.

Modeling of the smoothed luminance signal by separable shape functions is challenging, as is smoothing a signal by a Gaussian function. For example, the modeling involves matrix computations, which are not hardware friendly and requires considerable memory; Gaussian smoothing is likewise not hardware friendly. To overcome those disadvantages, a moving average filter can be used to obtain the low frequency version of the image. The conventional coding techniques are too complicated to perform. The moving average filter is hardware friendly and easy to implement as an add-on or pre/processing unit.

Taking M point moving averaging filter as an example, where M is chosen as an odd number, and the input signal is symmetrical around the output signal. Let M=2N+1, the M point moving average filter is defined as Equation (11) below:

$$y[i] = \frac{1}{M} \sum_{j=-N}^{N} x[i+j] \tag{11}$$

By analysis using the Central Limit Theorem, a high quality approximation of Gaussian smoothing can be obtained by the simple moving average filter.

Figure 4A:
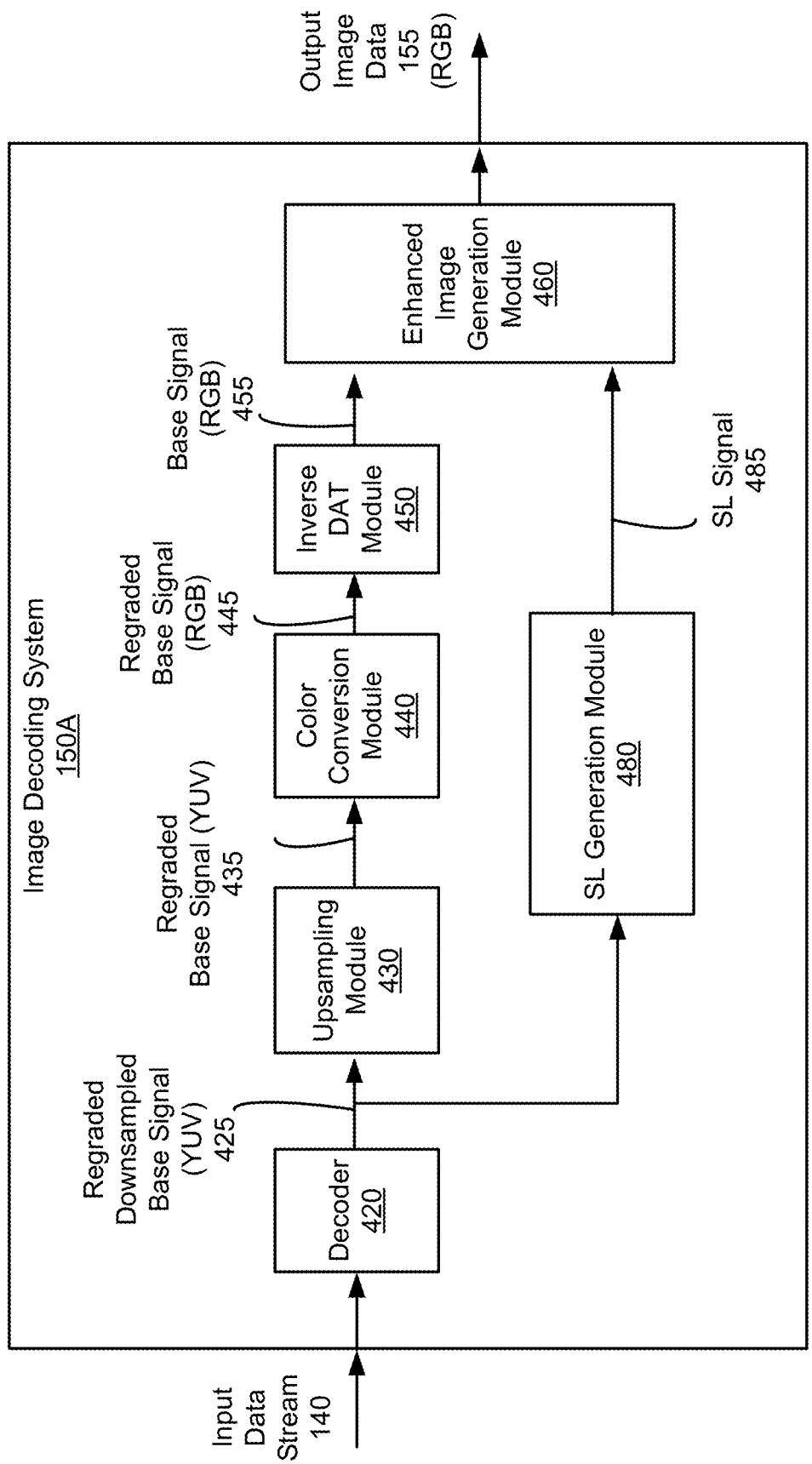
FIG. 4A illustrates an image decoding system according to one embodiment.

FIG. 4A is an image decoding system 150A according to one embodiment. The image decoding system 150A receives a single data stream 140, for example, from the image encoding system 130A of FIG. 2A, and generates the output image data 155. In one aspect, the output image data are a HDR image data represented in the RGB color space. In one embodiment, the image decoding system 150A includes a decoder 420, an upsampling module 430, a color conversion module 440, an inverse DAT module 450, an enhanced image generation module 460, and a SL generation module 480. These components can be implemented as hardware, software, firmware, or a combination thereof. In alternative embodiments, different and/or additional components may be included or some components may be omitted.

The decoder 420 receives the input data stream 140, for example, from the image encoding system 130A, and generates a regraded downsampled base signal 425. The decoder 420 decodes the input data stream 140 to generate the regraded downsampled base signal 425 in the YUV color space. In one embodiment, the decoder 420 implements a standard codec (e.g., ITU/ISO/IEC HEVC/H.265, ITU/ISO/IEC AVC/H.264, ITU/ISO/IEC MPEG-2/H.262, Alliance for Open Media, Google VPX, and Xiph Theora, etc.) for decoding encoded data into standard dynamic range image data. In some embodiments, the decoder 420 implements other codecs for decoding encoded data into lower dynamic range image data having a lower dynamic range than a dynamic range of the output image data 155.

In one embodiment, the decoder 420 receives the input data stream 140, and obtains the SEI (e.g., InputPeakBrightness, TargetPeakBrightness, a number of bins, $binsize_k$, etc.) by decoding a portion of the input data stream 140 corresponding to metadata.

The SL generation module 480 receives the regraded downsampled base signal 425 and the SEI from the decoder 420, and generates the SL signal 485. In one embodiment, the SL generation module 480 obtains information describing the DAT performed by the image encoding system 130 in the SEI, and applies inverse DAT to the regraded downsampled base signal 425 to infer the SL signal 485 without actually receiving the SL signal from the image encoding system 150A. Detailed structure and operation of the SL generation module 480 are described below with respect to FIG. 5.

The upsampling module 430 receives the regraded downsampled base signal 425 from the decoder 420A, and generates a regraded base signal 435. In the embodiment shown in FIG. 4A, the upsampling module 430 receives the regraded downsampled base signal 425 represented in the YUV color space, and performs upsampling in the YUV color space to generate the regraded base signal 435 represented in the YUV color space. In one embodiment, the upsampling performed by the upsampling module 430 is inverse to the downsampling performed by the downsampling module 260 of FIG. 2A.

In one embodiment, the upsampling module 430 implements interpolation filters for generating the regraded base signal 435. The filters implemented by the upsampling module 430 may be adaptive to input data, with the adaptation taking place at the sequence, GOP, frame, slice, or even block-level.

In one embodiment, the upsampling module 430 includes four interpolation filters to upsample the regraded downsampled base signal 425. For example, horizontal up sampling filter for even pixels, vertically up sampling filter for odd pixels, horizontal up sampling filter for odd pixels, and vertically up sampling filter for even pixels can be implemented. Let u[n] be a (non-unique) discrete interpolation filter, and then the filters used for horizontal and vertical upsampling can be identified as Equation (12) below:

$$hue[n]=u[4n], vuo[n]=u[4n+1], huo[n]=u[4n+2], \text{ and } vue[n]=u[4n+3]. \quad (12)$$

Example filter values are provided in Table 4 below.

TABLE 4

Example Filter Values

| | |
|---|---|
| u | (+8.0, +0.0, −16.0, −16.0, −32.0, +0.0, +56.0, +144.0, +240.0, +256, +240.0, +144.0, +56.0, +0.0, −32.0, −16.0, −16.0, +0.0 +8.0)/256 |
| hue | (+256.0)/256 |
| vuo | (+0.0, −16.0, +56.0, +240.0, −32.0, +8.0)/256 |
| huo | (−16.0, +144.0, +144.0, −16.0)/256 |
| vue | (+8.0, −32.0, +240.0, +56.0, −16.0, +0.0)/256 |

As an example, two separate vertical upsampling filters are used to restore samples at odd and even indices, respectively. Example filter coefficients for even samples filter are provided in Table 5, while those for the odd samples are provided in Table 6. Similarly, two separate horizontal upsampling filters are used to restore samples at odd and even indices, respectively. Example filter coefficients for even samples filter are provided in Table 7, while those for the odd samples are provided in Table 8.

TABLE 5

Example Vertical Upsampling Filter Coefficients (4:2:0 to 4:2:2) for Even Samples

| | Tap k | | | | | |
|---|---|---|---|---|---|---|
| | −3 | −2 | −1 | 0 | 1 | 2 |
| Coefs d1 [k] | 9 | −27 | 75 | 228 | −42 | 13 |

TABLE 6

Example Vertical Upsampling Filter Coefficients (4:2:0 to 4:2:2) for Odd Samples

| | Tap k | | | | | |
|---|---|---|---|---|---|---|
| | −2 | −1 | 0 | 1 | 2 | 3 |
| Coefs d2 [k] | 9 | 13 | −27 | −42 | 75 | 228 |

TABLE 7

Example Horizontal Upsampling Filter Coefficients (4:2:2 to 4:4:4) for Even Samples

| Tap k | 0 |
|---|---|
| Coefs d3[k] | 16 |

TABLE 8

Example Horizontal Upsampling Filter Coefficients (4:2:2 to 4:4:4) for Odd Samples

| | Tap k | | | | | |
|---|---|---|---|---|---|---|
| | −2 | −1 | 0 | 1 | 2 | 3 |
| Coefs d4 [k] | 1 | −3 | 10 | 10 | −3 | 1 |

The color conversion module 440 receives the regraded base signal 435 from the inverse DAT module 450 and performs color conversion. In the embodiment shown in FIG. 4A, the color conversion module 440 receives the regraded base signal 435 represented in the YUV color space, and performs color conversion to obtain the regraded base signal 445 represented in the RGB color space.

The inverse DAT module 450 receives the regraded base signal 445 from the color conversion module 440, and applies an inverse transfer function to the regraded base signal 445 to obtain a base signal 455. In the embodiment shown in FIG. 4A, the inverse DAT module 450 receives the regraded base signal 445 in the RGB color space, and performs inverse adaptive monotonic nonlinear mapping with data adaptive tuning in the RGB color space to generate the base signal 455 in the RGB color space. In some embodiments, the base signal 455 is generated by performing an inverse process to the adaptive monotonic nonlinear mapping with data adaptive tuning performed by the DAT module 240 of FIG. 2A. For example, the parameters used for performing DAT can be extracted from the metadata included in the input data stream 140, and the inverse adaptive monotonic nonlinear mapping can be performed by the inverse DAT module 450 according to the extracted parameters. In some embodiments, inverse adaptive monotonic nonlinear mapping, and/or data adaptive tuning performed by the inverse DAT module 450 can be implemented in a similar manner as the SL generation module 480.

The enhanced image generation module 460 receives the base signal 455 from the inverse DAT module 450 and the SL signal 485 from the SL generation module 480, and generates the output image data 155. In the embodiment shown in FIG. 4A, the enhanced image generation module 460 receives the base signal 455 represented in the RGB color space and obtains the output image data 155 represented in the RGB color space based on the base signal 455 and the SL signal 422. Specifically, the enhanced image generation module 460 generates the output image data 155 by multiplying the base signal 455 represented in the RGB color space by the SL signal 422. That is, each color component (RGB) of the base signal 455 is multiplied by the SL signal 422. Hence, the output image data 155 can be represented as the following Equation (13):

$$RGB_{HDR} = SL \qquad (13)$$

where $RGB_{HDR}$ corresponds to values of the output image data 155 (for red, green, blue components), SL corresponds to the SL signal 485, and B corresponds to the base signal 455 of red, green, blue color components. The output image data 155 can be provided to the sink device 170 of FIG. 1, and displayed to the user.

Figure 4B:
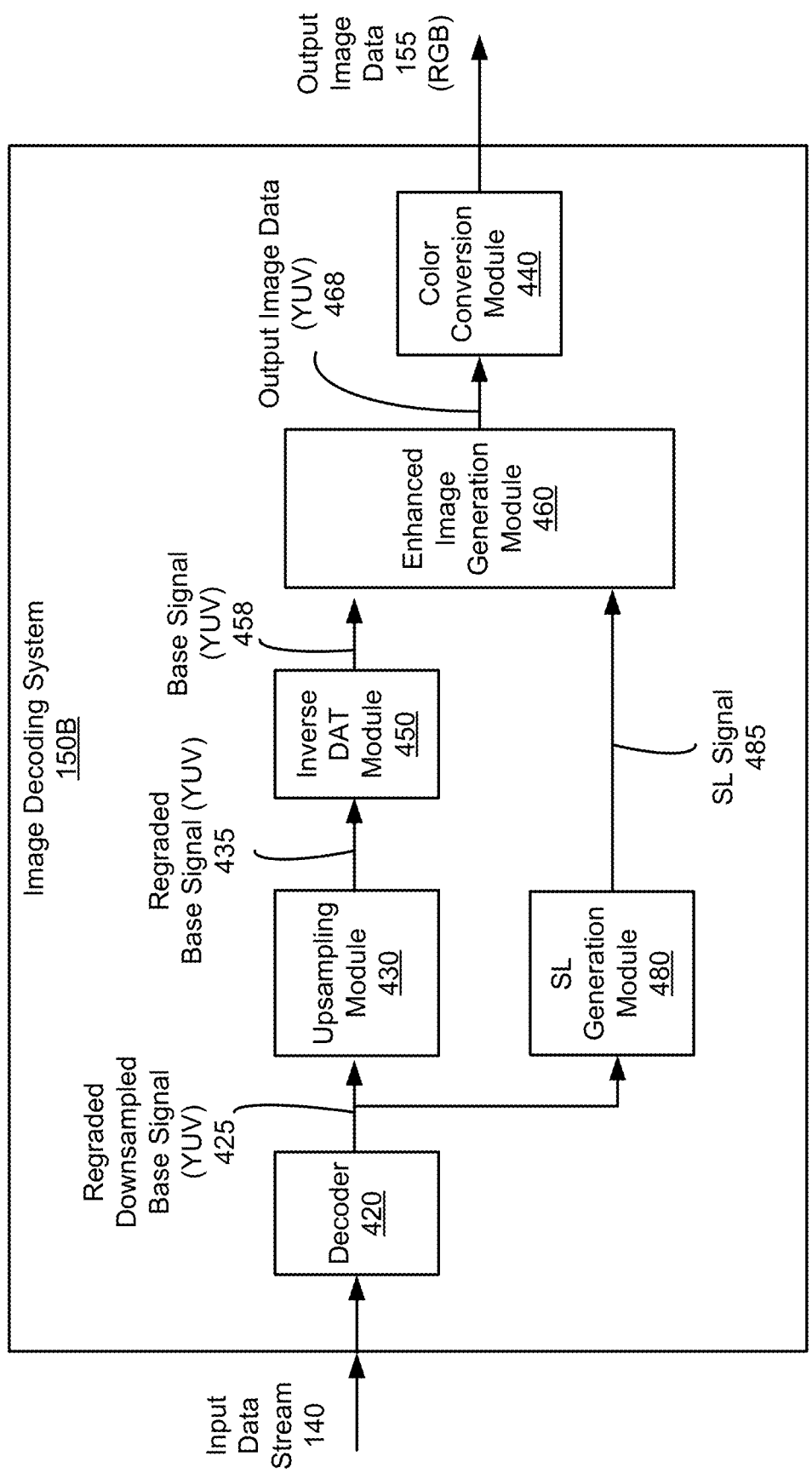
FIG. 4B illustrates an image decoding system according to another embodiment.

FIG. 4B illustrates an image decoding system 150B according to another embodiment. The image decoding system 150B receives a single input data stream 140, for example, from the image encoding system 130B shown in FIG. 2B. In the embodiment shown in FIG. 4B, the image decoding system 150B includes the decoder 420, the upsampling module 430, the color conversion module 440, the inverse DAT module 450, the SL generation module 480, and the enhanced image generation module 460. The configurations of these components are similar to the ones shown in FIG. 4A, except that the color conversion module 440 between the upsampling module 430 and the inverse DAT module 450 in FIG. 4A is provided after the enhanced image generation module 460 in FIG. 4B. Accordingly, the inverse DAT module 450 and the enhanced image generation module 460 operate in the YUV color space. The decoder 420, the SL generation module 480, and the upsampling module 430 operate as shown in FIG. 4A. Thus, the detailed description thereof is omitted herein for the sake of brevity.

In the embodiment shown in FIG. 4B, the inverse DAT module 450 receives the regraded base signal 435 represented in the YUV color space, and obtains the base signal 458 represented in the YUV color space. In this embodiment, the inverse DAT module 450 performs inverse adaptive monotonic nonlinear mapping with data adaptive tuning in the YUV color space, instead of the RGB color space.

The enhanced image generation module 460 receives the base signal 458 represented in the YUV color space from the inverse DAT module 450, and the SL signal 485 from the SL generation module 480 to generate the output image data 468 represented in the YUV color space. In one embodiment, the enhanced image generation module 460 obtains the output image data 468 according to Equation (14) below:

$$Y_{HDR} = Y_{SDR} * Y\_SL, Cb_{HDR} = Cb_{SDR} * Cb\_SL,$$
$$Y_{HDR} = Cr_{SDR} * Cr\_SL \qquad (14)$$

where $Y_{HDR}$ is a luminance component of the output image data 468 represented in the YUV color space, $Cb_{HDR}$ is a blue difference chroma component of the output image data 468 represented in the YUV color space, $Cr_{HDR}$ is a red difference chroma component of the output image data 468 represented in the YUV color space, Y_SL can be a luminance component of the SL signal 485, Cb_SL can be a derived blue difference chroma component of the SL signal 485, and Cr_SL can be a derived red difference component of the SL signal 485. $Y_{SDR}$ is a luminance component of the base signal 458 represented in the YUV color space, $Cb_{HDR}$ is a blue difference chroma component of the base signal 458 represented in the YUV color space, and $Cr_{SDR}$ is a red difference chroma component of the base signal 458 represented in the YUV color space. In some embodiments, the Cb_SL and Cr_SL can be replaced with Y_SL.

In the embodiment shown in FIG. 4B, the color conversion module 440 receives the output image data 468 represented in the YUV color space, and performs color conversion to obtain the output image data 155 represented in the RGB color space.

Figure 4C:
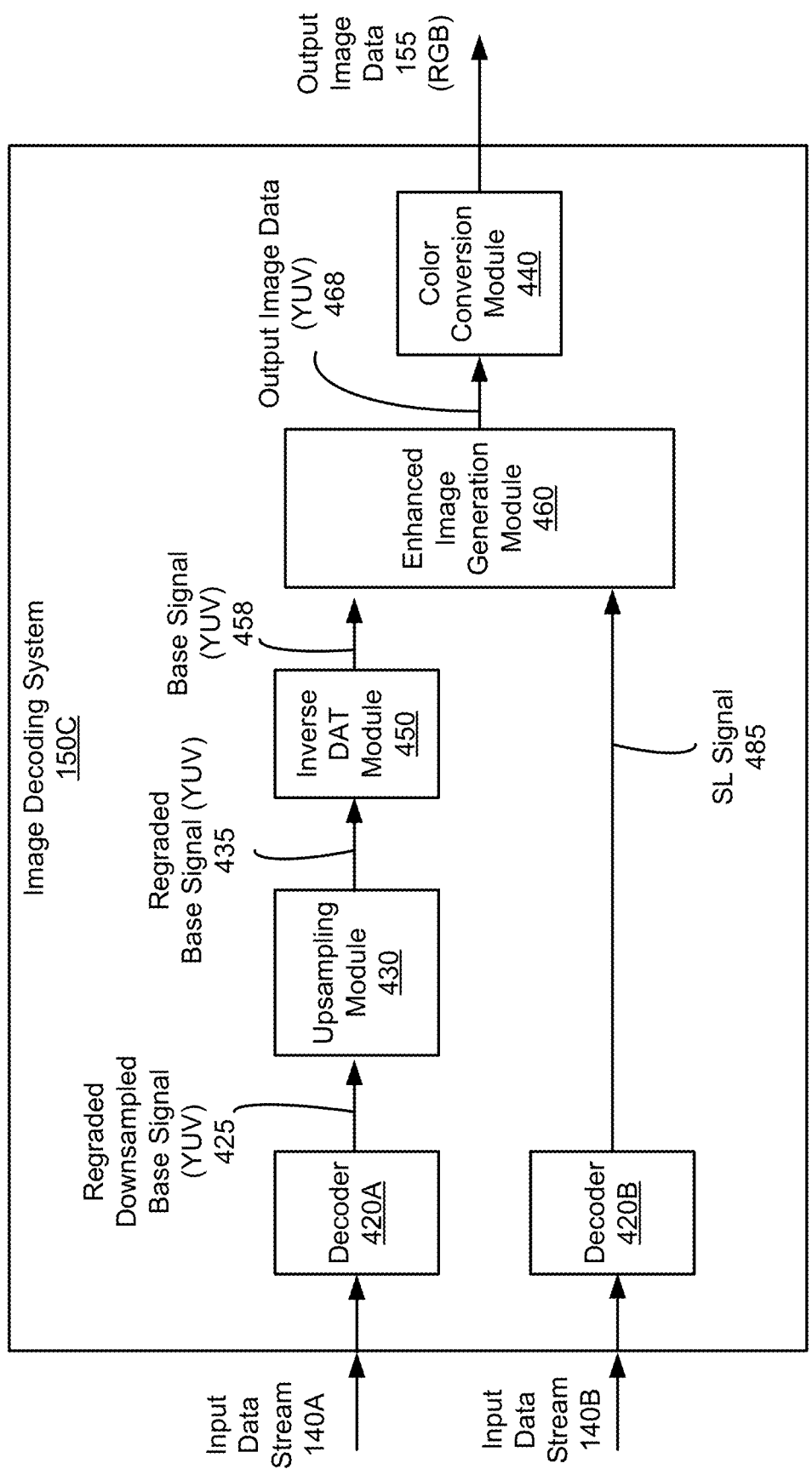
FIG. 4C illustrates an image decoding system according to another embodiment.

FIG. 4C illustrates an image decoding system 150C according to another embodiment. The image decoding system 150C receives dual input data streams 140A and 140B, for example, from the image encoding system 130C shown in FIG. 2C. In the embodiment shown in FIG. 4C, the image decoding system 150B includes the decoders 420A, 420B, the upsampling module 430, the color conversion module 440, the inverse DAT module 450, and the enhanced image generation module 460. The configurations of these components are similar to the ones shown in FIG. 4B, except that the SL generation module 480 of FIG. 4B is omitted and an additional decoder 420B is provided to obtain the SL signal 485. The decoder 420A, the upsampling module 430, the inverse DAT module 450, the enhanced image generation module 460, and the color conversion module 440 operate as shown in FIG. 4B. Thus, the detailed description thereof is omitted herein for the sake of brevity.

In the embodiment shown in FIG. 4C, the decoder 420B receives the input data stream 140B including an encoded SL signal, and decodes the input data stream 140B to obtain the SL signal 485. In one embodiment, the decoder 420B implements a standard codec (e.g., ITU/ISO/IEC HEVC/H.265, ITU/ISO/IEC AVC/H.264, ITU/ISO/IEC MPEG-2/H.262, Google VPX, and Xiph Theora, etc.) for decoding encoded data into standard dynamic range image data. In some embodiments, the decoder 420B implements other codecs for decoding encoded data into lower dynamic range image data having a lower dynamic range than a dynamic range of the output image data 155.

In this embodiment shown in FIG. 4C, a simple decoding process is performed by the decoder 420B, without implementing the SL generation module 480 of FIG. 2 to infer the SL signal 485. Hence, the computing resource of the image decoding system 150C can be reduced compared to the image decoding system 150C of FIG. 4B, at the cost of additional bandwidth for receiving the input data stream 140B.

Figure 5:
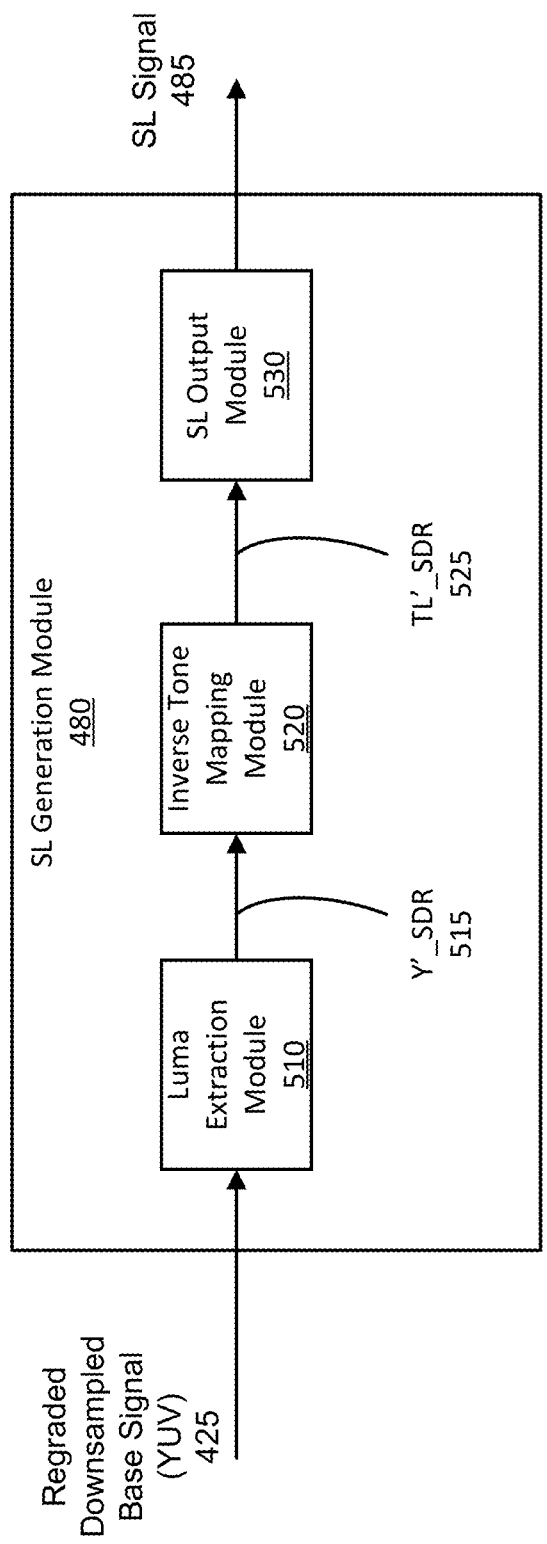
FIG. 5 illustrates a smoothed luminance generation module of the image decoding system according to another embodiment.

FIG. 5 is a smoothed luminance generation module 480 of the image decoding system 150A or 150B, according to another embodiment. The SL generation module 480 receives the regraded downsampled base signal 425 and parameters used for performing adaptive tone mapping and/or DAT by the image encoding system 130 and generates (or infers) the SL signal 485. In one embodiment, the SL generation module 480 includes a luma extraction module 510, an inverse tone mapping module 520, and a SL output module 530. These components can be implemented as hardware, software, firmware, or a combination thereof. In alternative embodiments, different and/or additional components may be included or some components may be omitted.

The luma extraction module 510 receives the regraded downsampled base signal 425 from the decoder 420, and obtains a luminance component Y'_SDR 515 of the regraded downsampled base signal 425.

The inverse tone mapping module 520 receives parameters used for performing adaptive tone mapping and/or DAT from the decoder 420 and determines an inverse tone mapping to be applied. The inverse tone mapping module 520 applies the inverse tone mapping to the luminance component Y'_SDR 515 to obtain TL'_SDR 525.

The SL output module 530 receives the TL'_SDR 525 from the inverse tone mapping module 520, and applies the luminance component Y'_SDR 515 to the TL'_SDR 525 to generate the SL signal 485.

Figure 6A:
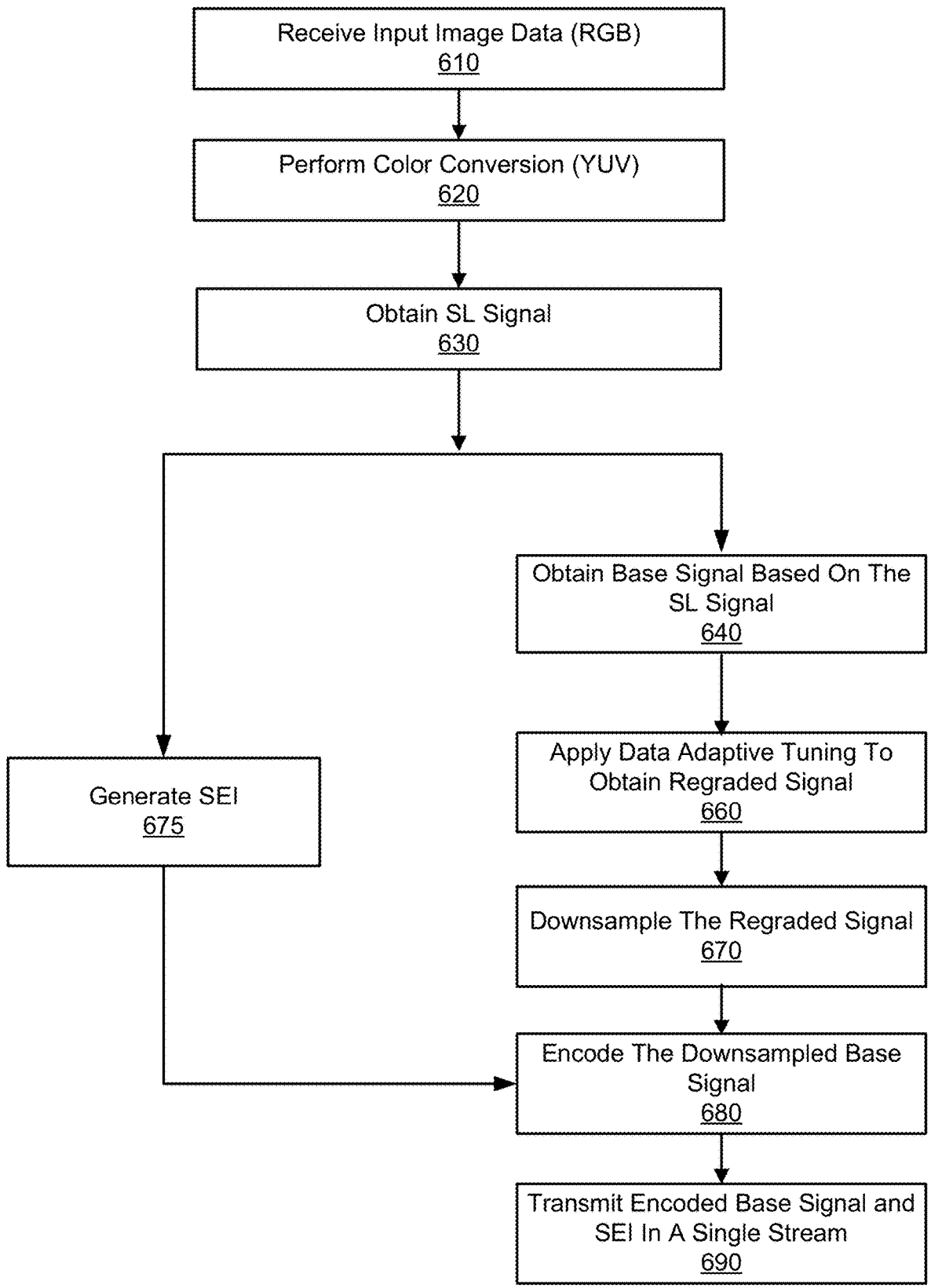
FIG. 6A is a flow chart illustrating a process of encoding high dynamic range image data into a single stream according to one embodiment.

FIG. 6A is a flow chart illustrating a process of encoding high dynamic range image data into a single stream according to one embodiment. The steps shown in FIG. 6A can be performed by the image encoding system 130 (e.g., image encoding system 130B of FIG. 2B). In other embodiments, some or all of the steps may be performed by other entities. In addition, some embodiments may perform the steps in parallel, perform the steps in different orders, or perform different steps.

The image encoding system 130 receives 610 input image data 115. In one embodiment, the input image data 115 is represented in the RGB color space.

The image encoding system 130 performs 620 color conversion to obtain the input image data 218 represented in the YUV color space.

The image encoding system 130 obtains 630 a SL signal 225 based on the input image data 218 represented in the YUV color space. In one embodiment, the image encoding system 130B implements data adaptive tuning to obtain the SL signal 225.

The image encoding system 130 obtains 640 a base signal 238 represented in the YUV color space based on the SL signal 225. In one embodiment, the base signal 238 is obtained by dividing the input image data 218 represented in the YUV color space with the SL signal 225. Specifically, each of the luminance component and chroma components of the base signal 238 can be divided by the SL signal 225.

The image encoding system 130 applies 660 data adaptive tuning to the base signal 238 to obtain the regraded base signal 248. The data adaptive tuning can be performed based on, for example, statistics of the base signal (e.g., luminance distribution). In one embodiment, the data adaptive tuning is performed in the YUV color space.

The image encoding system 130 downsamples 670 the regraded base signal 248 to obtain the downsampled base signal 265. In one embodiment, the image encoding system 130 downsamples the regraded base signal 248 represented in the 4:4:4 format into the 4:2:0.

The image encoding system 130 encodes 680 the downsampled base signal 265. In one embodiment, the image encoding system 130 generates metadata or SEI describing parameters used for performing data adaptive tuning. The image encoding system 130 generates a data stream 140 by adding the metadata or the SEI to the encoded base signal. In another embodiment, the image encoding system 130 encodes the SL signal and adds the encoded SL signal to the data stream 140.

The image encoding system 130 transmits 690 the data stream 140 including the encoded base signal and the SEI to the image decoding system 150.

Figure 6B:
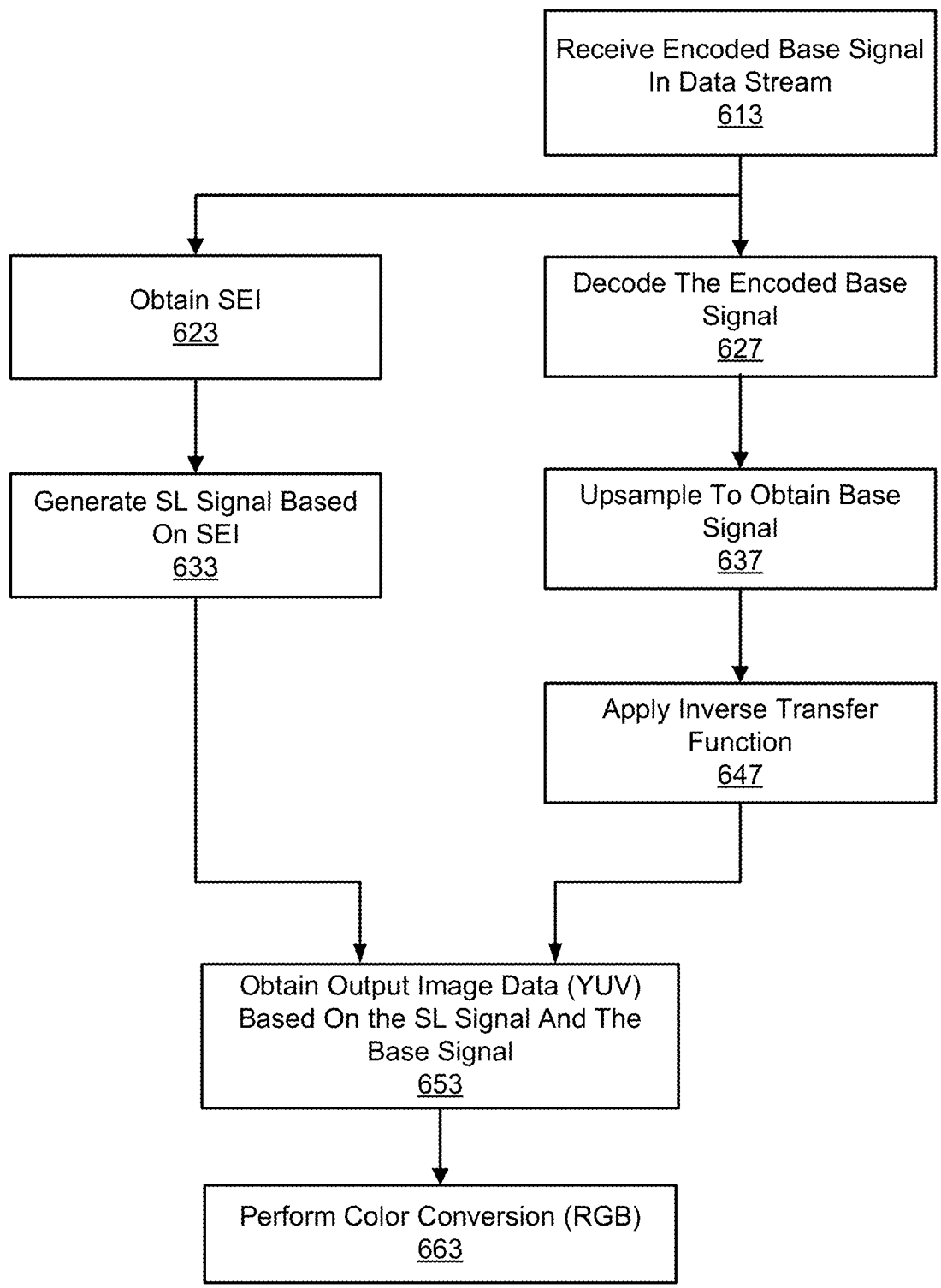
FIG. 6B is a flow chart illustrating a process of decoding a single stream into high dynamic range image data according to one embodiment.

FIG. 6B is a flow chart illustrating a process of decoding a single stream into high dynamic range image data according to one embodiment. The steps shown in FIG. 6B can be performed by the image decoding system 150 (e.g., image encoding system 150B of FIG. 4B). In other embodiments, some or all of the steps may be performed by other entities. In addition, some embodiments may perform the steps in parallel, perform the steps in different orders, or perform different steps.

The image decoding system 150 receives 613 a single data streaming including an encoded base signal. The image decoding system 150 decodes 627 the encoded base signal to obtain a regraded downsampled base signal 425 represented in the YUV color space.

The image decoding system 150 decodes 623 the encoded base signal to obtain SEI describing parameters used for performing DAT at the encoding system 130.

The image decoding system upsamples 637 the regraded downsampled base signal 425 represented in the YUV color space to obtain a regraded base signal 435 represented in the YUV color space. In one embodiment, the image decoding system upsamples the regraded downsampled base signal 425 in the 4:2:0 format into the 4:4:4 format.

The image decoding system 150 applies 647 inverse DAT to the regraded base signal 435 to obtain the base signal 458 represented in the YUV color space. In one embodiment, the image decoding system 150 can determine inverse DAT to the DAT applied in the image encoding system 130 based on the SEI.

The image decoding system 150 generates 633 (or infers) the SL signal 485 based on the SEI. In one embodiment, the image decoding system 150 determines an inverse tone mapping to be applied based on the SEI. The image decoding system 150 applies the inverse tone mapping to a luminance component Y'_SDR 515 to obtain TL'_SDR 525, and then generates the SL signal 485 by applying the luminance component Y'_SDR 515 to the TL'_SDR 525.

The image decoding system 150 obtains 653 output image data 468 represented in the YUV color space based on the SL signal 485 and the base signal 458. In one embodiment, the output image data 468 represented in the YUV color space is obtained by multiplying the base signal 458 represented in the YUV color space with the SL signal 485. Specifically, each of the luminance component and chroma components of the base signal 458 can be multiplied by the SL signal 225.

The image decoding system 150 performs 663 color conversion on the output image data 468 represented in the YUV color space into the RGB color space.

Figure 7A:
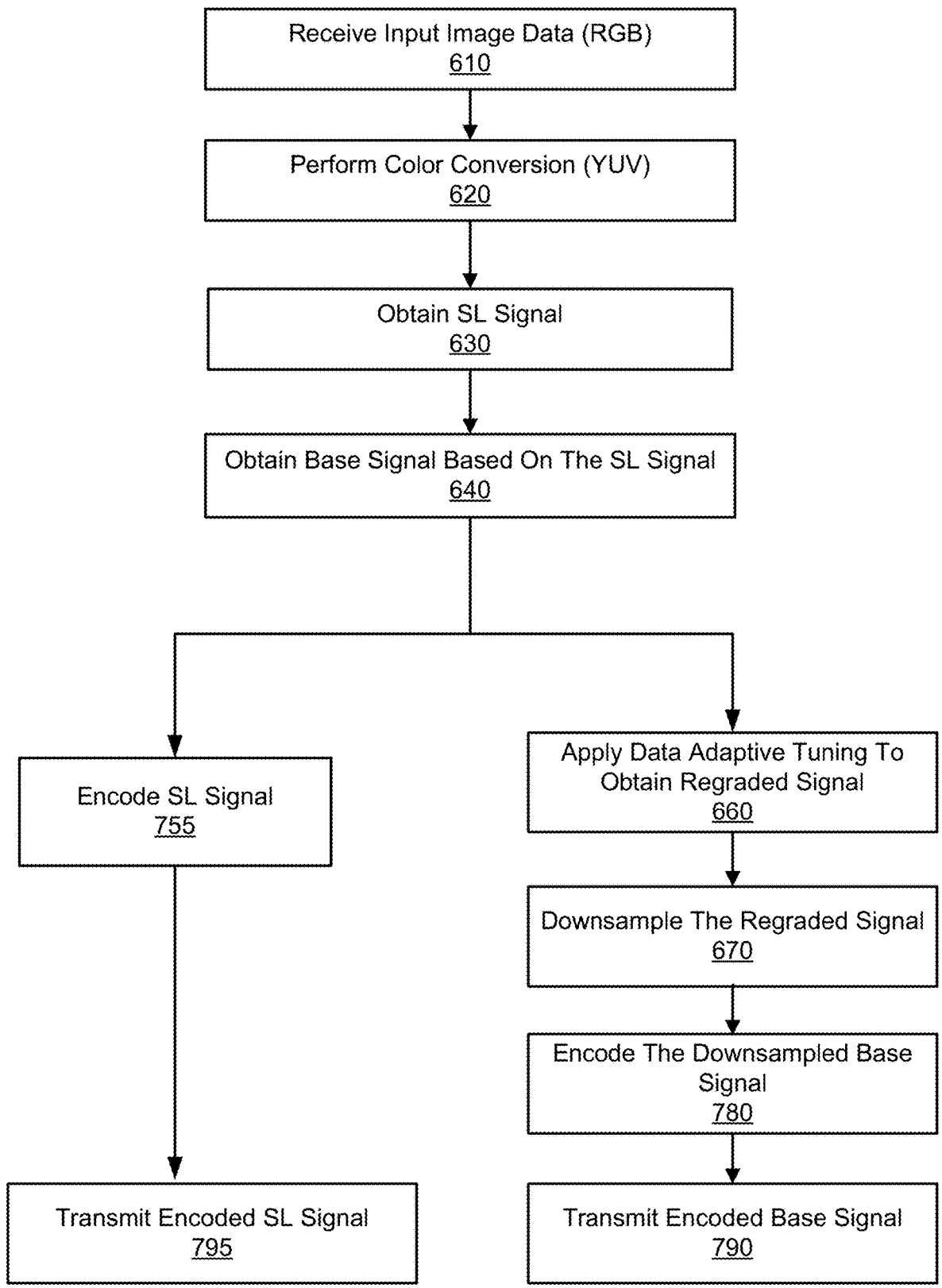
FIG. 7A is a flow chart illustrating a process of encoding high dynamic range image data into two data streams according to one embodiment.

FIG. 7A is a flow chart illustrating a process of encoding high dynamic range image data into dual streams 140A, 140B, according to one embodiment. The steps shown in FIG. 7A can be performed by the image encoding system 130 (e.g., image encoding system 130C of FIG. 2C). The steps 610, 620, 630, 640, 660, and 670 are identical to the ones shown in FIG. 6A, except that the steps 675, 680, 690 of FIG. 6A are replaced with steps 755, 780, 790, 795. Therefore, the detailed description of the steps 610, 620, 630, 640, 660, and 670 is omitted herein for the sake of brevity. In other embodiments, some or all of the steps may be performed by other entities. In addition, some embodiments may perform the steps in parallel, perform the steps in different orders, or perform different steps.

In the embodiment shown in FIG. 7A, the image encoding system 130 encodes 780 the downsampled base signal to generate a first data stream 140A, irrespective of the SL signal. In addition, the image encoding system 150 encodes 755 the SL signal 225 to generate a second data stream 140B.

The image encoding system 130 transmits 790 the first data stream 140A including the encoded base signal, and transmits 795 the second data stream 140B including the encoded SL signal to the image decoding system 150.

Figure 7B:
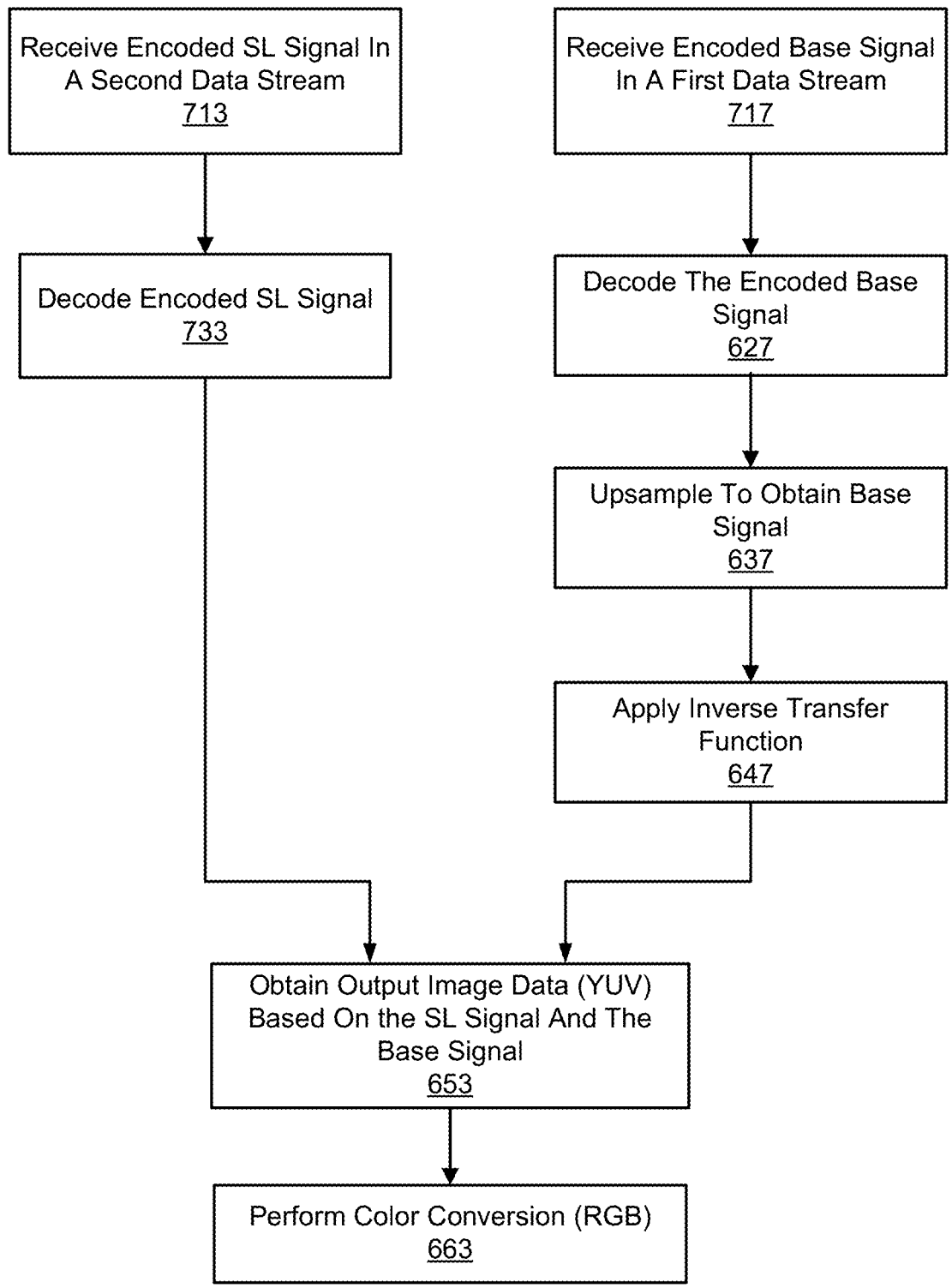
FIG. 7B is a flow chart illustrating a process of decoding two streams into high dynamic range image data according to one embodiment.

FIG. 7B is a flow chart illustrating a process of decoding dual streams into high dynamic range image data according to one embodiment. The steps shown in FIG. 7B can be performed by the image decoding system 150 (e.g., image encoding system 150C of FIG. 4C). The steps 627, 637, 647, 653, and 663 in FIG. 7B are identical to the ones shown in FIG. 6B, except that the steps 613, 623, 633 of FIG. 6B are replaced with steps 713, 717, 733. Therefore, the detailed description thereof is omitted herein for the sake of brevity. In other embodiments, some or all of the steps may be performed by other entities. In addition, some embodiments may perform the steps in parallel, perform the steps in different orders, or perform different steps.

In the embodiment shown in FIG. 7B, the image decoding system 150 receives 613 a first data stream 140A including an encoded base signal, and receives 713 a second data stream 140B including encoded SL signal. The image decoding system 150 can decode 627 the encoded base signal in the first data stream 140A. Similarly, the image decoding system 150 can decode 733 the encoded SL signal in the second data stream 140B to generate the SL signal 485.

Figure 8A:
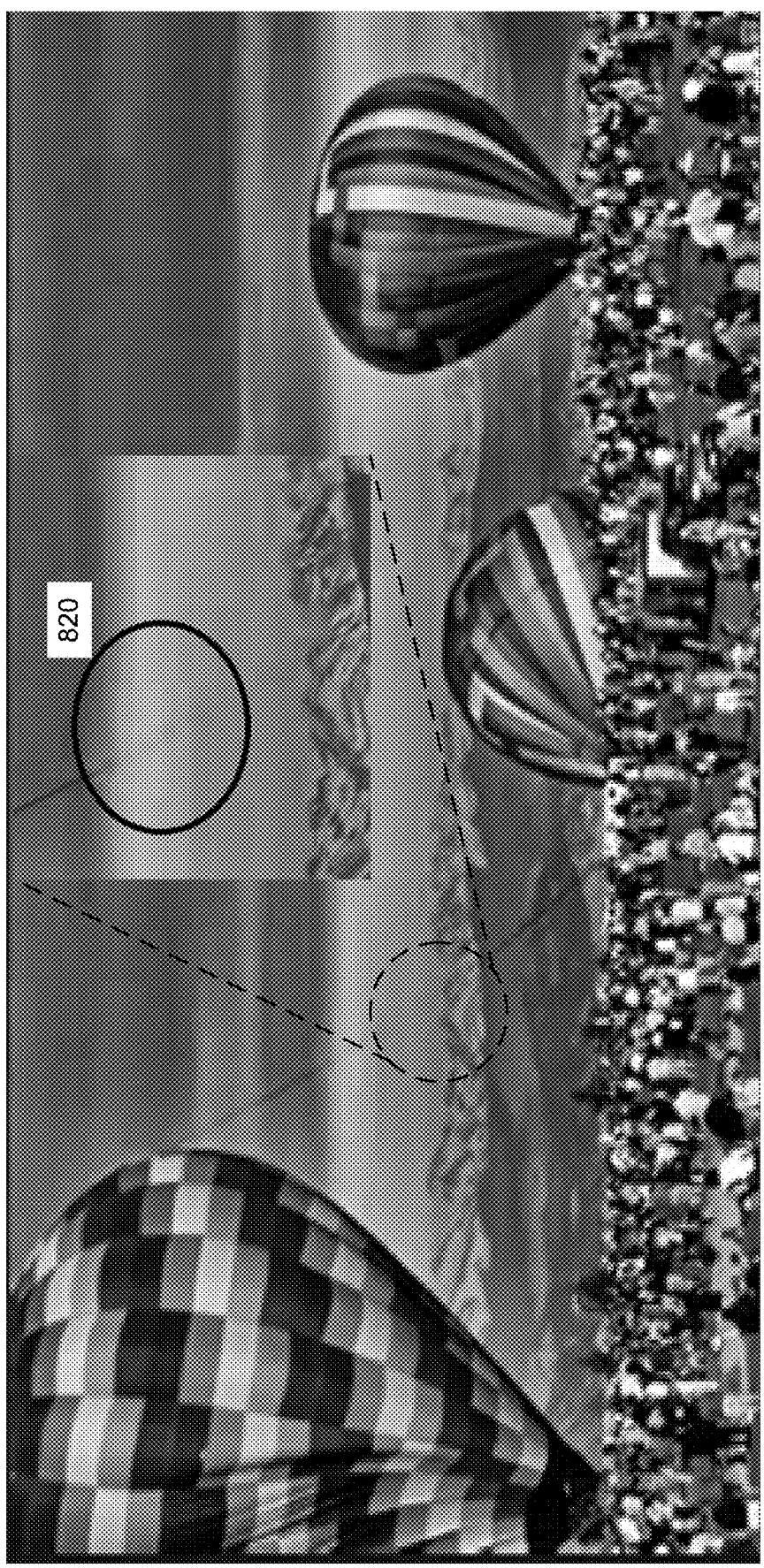
FIG. 8A is an example of a reconstructed sample image using a conventional high dynamic range encoding and decoding.
Figure 8B:
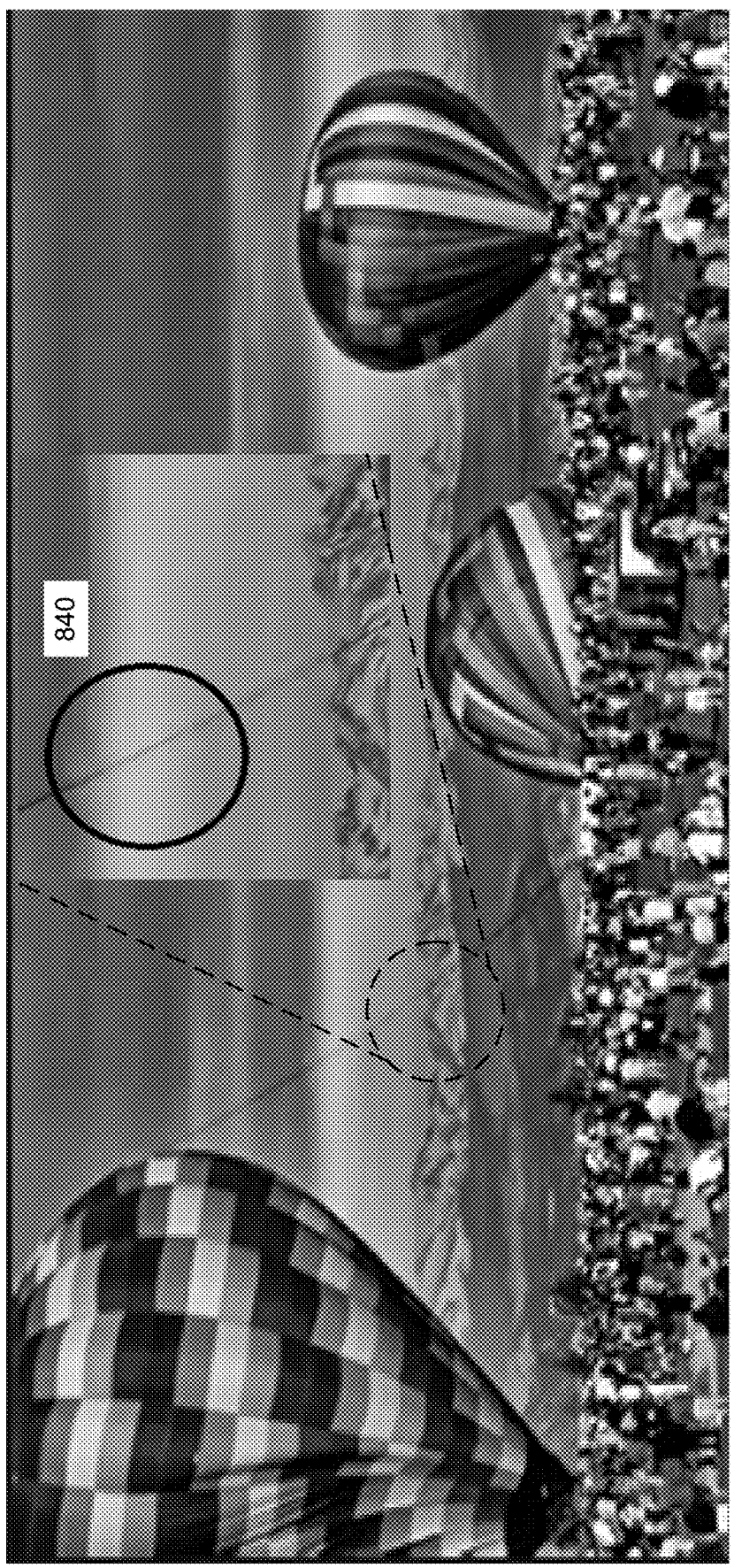
FIG. 8B is an example of a reconstructed sample image shown in FIG. 8A using enhanced high dynamic range encoding and decoding according to one embodiment.

FIG. 8A is an example of a reconstructed sample image using a conventional high dynamic range encoding and decoding. FIG. 8B is an example of a reconstructed sample image shown in FIG. 8A using enhanced high dynamic range encoding and decoding according to one embodiment. As shown in FIG. 8B, a high dynamic range image can be encoded and decoded through standard codec (HEVC) according to one or more embodiments disclosed herein, while preserving details of the image (e.g., a line 840).

Certain embodiments are described herein as including logic or a number of components, modules (herein may be also referred to as "tools"), or mechanisms, for example, as illustrated in FIGS. 1-7. Modules (or components) may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some embodiments, a software module is implemented with a computer program product comprising a computer-readable medium containing computer program code, which can be executed by a computer processor for performing any or all of the steps, operations, or processes described.

In some embodiments, a hardware module may be implemented electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. Hardware module implemented herein may be implemented in dedicated and permanently configured circuitry, or in temporarily configured circuitry (e.g., configured by software).

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method of encoding high-dynamic range video data, the method comprising:

selecting, by an encoding system, a video frame of the high-dynamic range video data to be processed, the video frame comprising high dynamic range image data;

extracting, by the encoding system, from the high-dynamic range image data represented in a red-green-blue (RGB) color space, a first signal corresponding to a luminance signal of the high-dynamic range image data;

generating a smoothed luminance signal from the first signal by performing a series of operations on the luminance signal, the smoothed luminance signal used for modifying the high dynamic range image data to generate a base signal in the red-green-blue (RGB) color space, comprising:

transforming, by the encoding system, the luminance signal using a selected data-adaptive opto-electrical transfer function (OETF) to generate an OETF luminance signal, wherein the selected data-adaptive OETF is selected based upon a measured peak brightness level of the selected video frame;

performing, by the encoding system, a tone mapping on the generated OETF luminance signal to generate a tone mapped base signal, the tone mapping based on a distribution characteristic of the OETF luminance signal; and transforming, by the encoding system, the tone mapped base signal using a selected data-adaptive electro-optical transfer function (EOTF) to generate the smoothed luminance signal to be used for modifying the high dynamic range image data to generate a base signal in the red-green-blue (RGB) color space, wherein the selected data-adaptive EOTF is an inverse of the data-adaptive OETF selected based upon the measured peak brightness level of the selected video frame;

modifying, by the encoding system, the high dynamic range image data using the smoothed luminance signal generated from the first signal to generate a base signal in the red-green-blue (RGB) color space, by dividing each color component of the high-dynamic range image data represented in the red-green-blue (RGB) color space by the smoothed luminance signal;

generating, by the encoding system, from the base signal, a regraded base signal in the RGB color space by performing a data adaptive tuning to the base signal, said data adaptive tuning of the base signal comprising applying an adaptive monotonic mapping of each component of the base signal for the selected frame, wherein a value of at least one coefficient of said adaptive monotonic mapping function to be applied on the selected frame is determined as a function of an input peak brightness of the selected video frame, and comprising:

determining a number of bins and binsizes to quantize the luminance signal into, the quantization based upon a luminosity distribution characteristic of the luminance signal;

determining a histogram of the luminance signal using the said number of bins and binsizes; and determining a monotonic mapping of the base signal based on features of the said histogram of the luminance signal with the said number of bins and binsizes;

performing, by the encoding system, a RGB to luma-chroma (YUV) color transformation on the regraded base signal;

encoding, by the encoding system, the regraded base signal to generate an encoded base signal;

generating, by the encoding system, metadata describing the smoothed luminance signal and parameters of the adaptive monotonic mapping; and generating, by an encoding system, a single stream including the encoded base signal and the metadata.

2. The method of claim 1, wherein generating the smoothed luminance signal further comprises automatically determining a selected number of binsizes of a luminosity histogram of the luminance signal according to the luminance distribution characteristic of the luminance signal.

3. The method of claim 2, wherein the luminosity histogram of the luminance signal is generated according to the selected number of binsizes.

4. The method of claim 1, wherein the adaptive monotonic mapping on the base signal is either an OETF or a gamut function from BT.2020 or BT.709.

5. The method of claim 1, wherein encoding the regraded base signal is based on a video coding standard selected from those by the ITU/ISO/IEC, Alliance for Open Media, Google VPX, or Xiph Theora.

6. A method of transmitting video data from a source device to a sink device, the method comprising:

selecting, by an encoding system, a video frame of the video data to process, the video frame comprising high dynamic range image data;

extracting, by the encoding system, from the high-dynamic range image data represented in a red-green-blue (RGB) color space, a first signal corresponding to a luminance signal of the high-dynamic range image data;

generating a smoothed luminance signal from the first signal by performing a series of operations on the luminance signal, the smoothed luminance signal used for modifying the high dynamic range image data to generate a base signal in the red-green-blue (RGB) color space, comprising:

transforming, by the encoding system, the luminance signal using a selected data-adaptive opto-electrical transfer function (OETF) to generate an OETF luminance signal, wherein the selected data-adaptive OETF is selected based upon a measured peak brightness level of the selected video frame;

performing, by the encoding system, a tone mapping on the generated OETF luminance signal to generate a tone mapped base signal, the tone mapping based on a distribution characteristic of the OETF luminance signal; and transforming, by the encoding system, the tone mapped base signal using a selected data-adaptive electro-optical transfer function (EOTF) to generate the smoothed luminance signal to be used for modifying the high dynamic range image data to generate a base signal in the red-green-blue (RGB) color space, wherein the selected data-adaptive EOTF is an inverse of the data-adaptive OETF selected based upon the measured peak brightness level of the selected video frame;

modifying the high dynamic range image data using the smoothed luminance signal generated from the first signal to generate a base signal in the red-green-blue (RGB) color space, by dividing each color component of the high-dynamic range image data represented in the red-green-blue (RGB) color space by the smoothed luminance signal;

generating, by the encoding system, from the base signal, a regraded base signal in the RGB color space by performing a data adaptive tuning to the base signal, said data adaptive tuning of the base signal comprising applying an adaptive monotonic mapping of each component of the base signal for the selected frame, wherein a value of at least one coefficient of said adaptive monotonic mapping function to be applied on the selected frame is determined as a function of an input peak brightness of the selected video frame, and comprising:

determining a number of bins and binsizes to quantize the luminance signal into, the quantization based upon a luminosity distribution characteristic of the luminance signal;

determining a histogram of the luminance signal using the said number of bins and binsizes; and determining a monotonic mapping of the base signal based on features of the said histogram of the luminance signal with the said number of bins and binsizes;

performing, by the encoding system, a RGB to luma-chroma (YUV) color transformation on the regraded base signal;

encoding, by the encoding system, the regraded base signal to generate a first stream; and transmitting, by the encoding system, the first stream to the sink device.

7. The method of claim 6, wherein performing the adaptive monotonic mapping on the base signal is based on video data on a sequence, GOP, frame, slice, or block-level of the base signal.

8. The method of claim 6, further comprising:
encoding the smoothed luminance signal; and
generating metadata describing the smoothed luminance signal,
wherein the first stream is generated by encoding the regraded base signal and adding the metadata to the encoded base signal.

9. The method of claim 6, further comprising:
encoding the smoothed luminance signal to generate a second stream different from the first stream; and
transmitting the second stream to the sink device.

10. The method of claim 6, further comprising:
generating metadata including parameters used for generating the smoothed luminance signal,
wherein the first stream is generated by encoding the regraded base signal and adding the metadata to the encoded base signal.

11. The method of claim 10, wherein the parameters include one of an input peak brightness, a target peak brightness, a number of bins, and bin sizes, that are adjusted according to the luminance component.

12. The method of claim 6, wherein the image data represents a peak brightness of at least 1000 nits, and wherein the regraded base signal represents image data of at most 500 nits.

13. The method of claim 6, further comprising:
converting the regraded base signal represented in the RGB color space into the YUV color space prior to the encoding to obtain the first stream.

14. A computer readable non-transitory storage medium storing instructions for:
selecting, by an encoding system, a video-frame of a high-dynamic range video to process, the frame comprising high dynamic range image data;
extracting, by the encoding system, from the high-dynamic range image data represented in a red-green-blue (RGB) color space, a first signal corresponding to a luminance signal of the high-dynamic range image data;
generating a smoothed luminance signal from the first signal by performing a series of operations on the luminance signal, the smoothed luminance signal used for modifying the high dynamic range image data to generate a base signal in the red-green-blue (RGB) color space, comprising:
transforming, by the encoding system, the luminance signal using a selected data-adaptive opto-electrical transfer function (OETF) to generate an OETF luminance signal, wherein the selected data-adaptive OETF is selected based upon a measured peak brightness level of the selected video frame;
performing, by the encoding system, a tone mapping on the generated OETF luminance signal to generate a tone mapped base signal, the tone mapping based on a distribution characteristic of the OETF luminance signal; and
transforming, by the encoding system, the tone mapped base signal using a selected data-adaptive electro-optical transfer function (EOTF) to generate the smoothed luminance signal to be used for modifying the high dynamic range image data to generate a base signal in the red-green-blue (RGB) color space, wherein the selected data-adaptive EOTF is an inverse of the data-adaptive OETF selected based upon the measured peak brightness level of the selected video frame;
modifying, by the encoding system, the high dynamic range image data using the smoothed luminance signal generated from the first signal to generate a base signal in the red-green-blue (RGB) color space, by dividing each color component of the high-dynamic range image data represented in the red-green-blue (RGB) color space by the smoothed luminance signal;
generating, by the encoding system, a regraded base signal in the RGB color space by performing a data adaptive tuning to the base signal, said data adaptive tuning of the base signal comprising applying an adaptive monotonic mapping of each component of the base signal for the selected frame, wherein a value of at least one coefficient of said adaptive monotonic mapping function to be applied on the selected frame is determined as a function of an input peak brightness of the selected video frame, and comprising:
determining a number of bins and binsizes to quantize the luminance signal into;
determining a histogram of the luminance signal using the said number of bins and binsizes; and
determining a monotonic mapping of the base signal based on features of the said histogram of the luminance signal with the said number of bins and binsizes;
encoding, by the encoding system, the regraded base signal to generate a first stream; and
transmitting, by the encoding system, the first stream to the sink device.

15. The computer readable non-transitory storage medium of claim 14, wherein the stored instructions are further for:
encoding the smoothed luminance signal; and
generating metadata describing the smoothed luminance signal,
wherein the first stream is generated by encoding the regraded base signal and adding the metadata to the encoded base signal.

16. The computer readable non-transitory storage medium of claim 14, wherein the stored instructions are further for:
encoding the smoothed luminance signal to generate a second stream different from the first stream; and
transmitting the second stream to the sink device.

17. The computer readable non-transitory storage medium of claim 14, wherein the stored instructions are further for:
generating metadata including parameters used for generating the smoothed luminance signal,
wherein the first stream is generated by encoding the regraded base signal and adding the metadata to the encoded base signal.

18. The method of claim 17, wherein encoding the regraded base signal is based on a video coding standard selected from those by the ITU, ISO/IEC, Alliance for Open Media, Google VPX, or Xiph Theora.

19. The method of claim 1, in which the data adaptive tuning of the base signal is performed using an adaptive monotonic function based on using a histogram analysis of the luminance signal of the selected video frame, comprising:
determining a number of bins and binsizes to quantize the luminance signal into;
determining a histogram of the luminance signal using the said number of bins and binsizes; and
determining a monotonic mapping of the base signal based on features of the said histogram of the luminance signal with the said number of bins and binsizes.

20. The method of claim 1, in which the tone mapping function applies a piecewise polynomial mapping to the OETF luminance signal based upon the distribution characteristic.

21. The method of claim 1, wherein the adaptive monotonic function comprises an adaptive monotonic nonlinear function or a piecewise linear function.

22. The method of claim 1, wherein extracting the first signal from the high-dynamic range image data comprises converting the image data from the RGB to a YFbFr color space.

* * * * *